(12) United States Patent
Ogawa

(10) Patent No.: US 7,920,087 B2
(45) Date of Patent: Apr. 5, 2011

(54) APPARATUS FOR ESTIMATING STATE OF VEHICLE LOCATED IN FRONTWARD FIELD

(75) Inventor: Takashi Ogawa, Kariya (JP)

(73) Assignee: Denso Corporation, Kariya (JP)

( * ) Notice: Subject to any disclaimer, the term of this patent is extended or adjusted under 35 U.S.C. 154(b) by 83 days.

(21) Appl. No.: 12/228,135

(22) Filed: Aug. 8, 2008

(65) Prior Publication Data
US 2009/0040095 A1 Feb. 12, 2009

(30) Foreign Application Priority Data
Aug. 10, 2007 (JP) ................................. 2007-210275

(51) Int. Cl.
*G01S 13/00* (2006.01)
*G01S 13/08* (2006.01)

(52) U.S. Cl. .................... 342/70; 342/118; 342/146

(58) Field of Classification Search .............. 342/70–72, 342/118, 146
See application file for complete search history.

(56) References Cited

U.S. PATENT DOCUMENTS

| | | | | |
|---|---|---|---|---|
| 5,051,751 A | * | 9/1991 | Gray | 342/107 |
| 5,283,837 A | * | 2/1994 | Wood | 382/285 |
| 5,798,727 A | * | 8/1998 | Shirai et al. | 342/70 |
| 5,955,967 A | * | 9/1999 | Yamada | 340/904 |
| 6,055,042 A | * | 4/2000 | Sarangapani | 356/4.01 |
| 6,067,110 A | * | 5/2000 | Nonaka et al. | 348/148 |
| 6,085,151 A | * | 7/2000 | Farmer et al. | 701/301 |
| 6,097,332 A | * | 8/2000 | Crosby, II | 342/72 |
| 6,249,243 B1 | * | 6/2001 | Takagi | 342/70 |
| 6,311,123 B1 | * | 10/2001 | Nakamura et al. | 701/96 |
| 6,593,873 B2 | * | 7/2003 | Samukawa et al. | 342/70 |
| 6,631,324 B2 | * | 10/2003 | Okamura et al. | 701/301 |
| 6,753,805 B2 | * | 6/2004 | Nakanishi et al. | 342/128 |
| 6,873,251 B2 | * | 3/2005 | Schiffmann et al. | 340/436 |
| 6,927,699 B2 | * | 8/2005 | Samukawa et al. | 340/903 |

(Continued)

FOREIGN PATENT DOCUMENTS

JP 2000-131436 5/2000

(Continued)

OTHER PUBLICATIONS

Office action dated Jul. 14, 2009 in corresponding Japanese Application No. 2007-210275.

*Primary Examiner* — Thomas H Tarcza
*Assistant Examiner* — Peter Bythrow
(74) *Attorney, Agent, or Firm* — Harness, Dickey & Pierce, PLC

(57) ABSTRACT

An estimation apparatus estimates a state of a vehicle located in a frontward field. Positional coordinates of a plurality of positions on an object are measured by radiating radar waves toward the frontward field and receiving reflected radar waves from an object in the frontward field. A position, direction and size of a graphical pattern are obtained by approximating the graphical pattern into a profile pattern of the object. The graphical pattern is modeled as a profile of a vehicle. A direction and size of the graphical pattern are unknown. The profile pattern is expressed by the positional coordinates. As the state of the vehicle located ahead, a position of the vehicle, a direction of the vehicle, and one of a whole length and a whole width of the vehicle are estimated based on the position, the direction, and the size of the graphical pattern.

4 Claims, 17 Drawing Sheets

U.S. PATENT DOCUMENTS

| | | | |
|---|---|---|---|
| 7,016,782 B2 * | 3/2006 | Schiffmann | 701/301 |
| 7,034,742 B2 * | 4/2006 | Cong et al. | 342/70 |
| 7,136,753 B2 * | 11/2006 | Samukawa et al. | 701/301 |
| 7,496,449 B2 * | 2/2009 | Samukawa et al. | 701/301 |
| 7,522,091 B2 * | 4/2009 | Cong et al. | 342/70 |
| 7,605,746 B2 * | 10/2009 | Matsuura et al. | 342/70 |
| 7,612,800 B2 * | 11/2009 | Okada et al. | 348/169 |
| 7,626,533 B2 * | 12/2009 | Cong et al. | 342/70 |
| 7,639,841 B2 * | 12/2009 | Zhu et al. | 382/104 |
| 2002/0107637 A1 * | 8/2002 | Okamura et al. | 701/301 |
| 2003/0235327 A1 * | 12/2003 | Srinivasa | 382/104 |
| 2004/0117090 A1 * | 6/2004 | Samukawa et al. | 701/45 |
| 2004/0239490 A1 * | 12/2004 | Chiba et al. | 340/435 |
| 2005/0093735 A1 * | 5/2005 | Samukawa et al. | 342/70 |
| 2006/0167633 A1 * | 7/2006 | Satonaka et al. | 701/300 |
| 2008/0077296 A1 * | 3/2008 | Kawasaki | 701/45 |
| 2009/0040095 A1 * | 2/2009 | Ogawa | 342/70 |

FOREIGN PATENT DOCUMENTS

| | | |
|---|---|---|
| JP | 2000-161436 | 5/2000 |
| JP | 2002-099986 | 4/2002 |
| JP | 2006-189393 | 7/2006 |

* cited by examiner

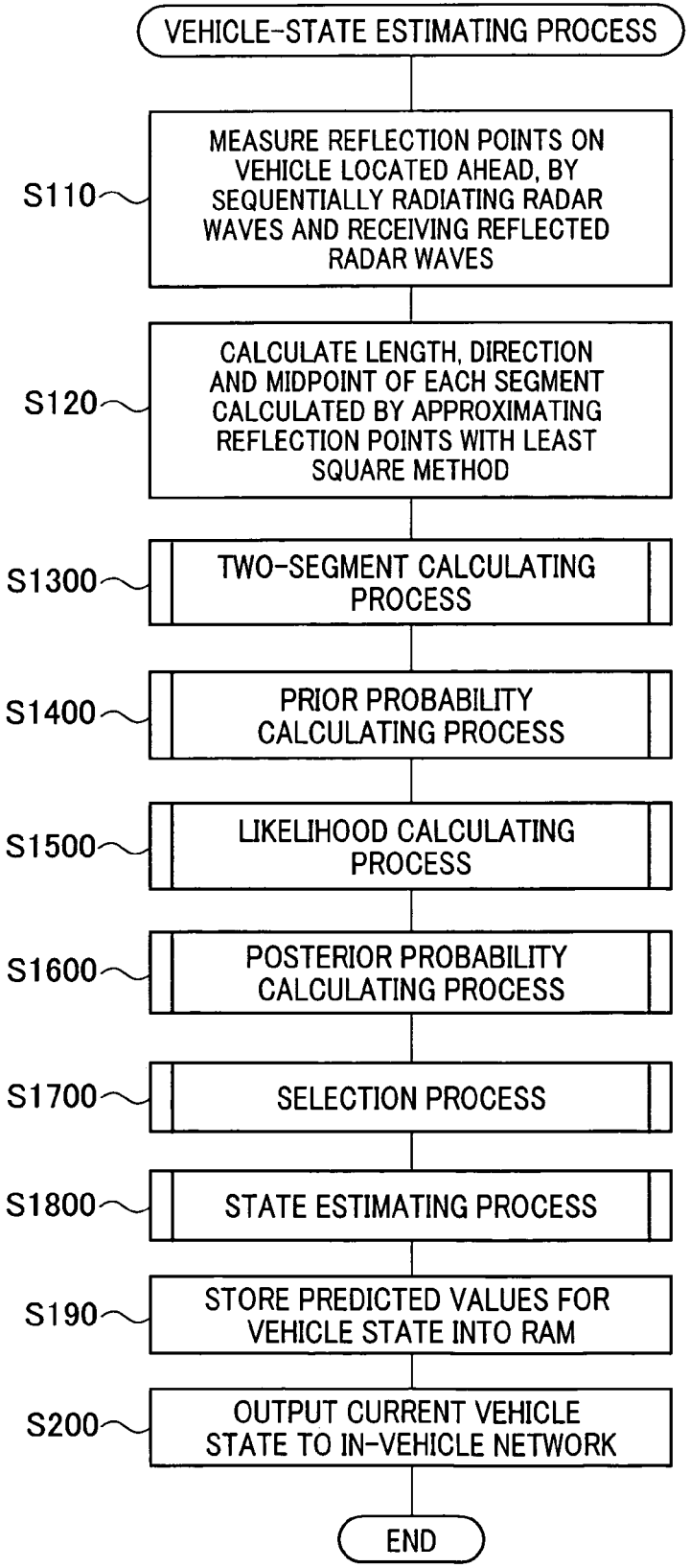

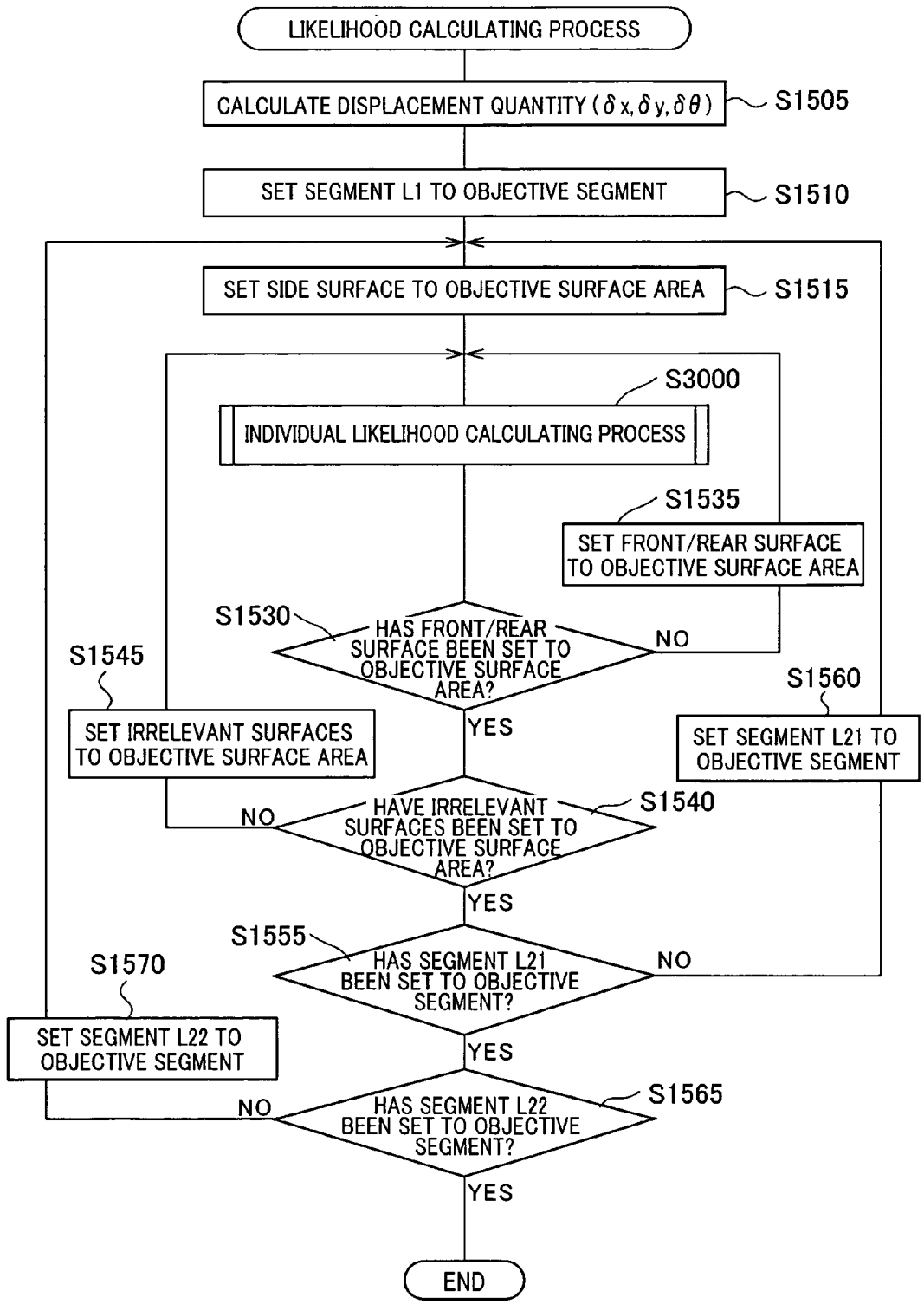

APPARATUS FOR ESTIMATING STATE OF VEHICLE LOCATED IN FRONTWARD FIELD

CROSS REFERENCES TO RELATED APPLICATIONS

The present application relates to and incorporates by reference Japanese Patent Application No. 2007-210275 filed on Aug. 10, 2007

BACKGROUND OF THE INVENTION

1. Field of the Invention

The present invention relates to an estimation apparatus for estimating the state of a vehicle located in a frontward field, and in particular, the estimation apparatus which involves, for the estimation, the transmission of radar waves toward a field and the reception of radar waves reflected from objects, such as vehicles, located in the field.

2. Description of the Related Art

Recently, various measures for driving safely have been provided. One such measure is to estimate the travel states of vehicles which are located ahead. Japanese Patent Laid-open Publication No. 2002-99986 discloses an apparatus which is able to provide such measures. This publication provides a radar apparatus that uses radar waves to estimate the travel state of a vehicle located apart from another vehicle.

In the configuration of this publication, the radar apparatus is arranged on a straight road and configured to periodically emit millimetric waves toward a given directional range. This radar apparatus receives radar waves reflected from a vehicle and estimates the travel state of the vehicle based on information derived from the received radar waves. Specifically, it is assumed that the vehicle is in a linear travel motion, so that the Kalman filter designed based on a linear motion model is used to calculate the speed and acceleration of travel of the vehicle. These calculated results are processed as information predicting the motion state of the vehicle. Using the radar apparatus, it is possible to detect the current position of the vehicle which travels on the road and, if a vehicle on the road is in a travel motion, it is also possible to predict the vehicle's accident states in the future. Accordingly, in this radar apparatus, both observed values and predicted values in the future raise the accuracy of determining whether or not the vehicle is stopped on the road and the accuracy of calculating the vehicle speed, whereby it is helpful for improving prediction of vehicle-to-vehicle collisions and urging drivers or vehicle systems to prevent such accidents.

However, the above-described estimation apparatus is confronted with two difficulties. One difficulty is that it is difficult to accurately detect information indicative of the size and direction of a vehicle located in the frontward field (hereinafter, simply referred to as "located ahead"). In this case, "accurately" means a degree of accuracy necessary to reliably prevent collisions between vehicles. Since the shape of a vehicle is unknown, it is very difficult to reliably predict the collisions. The other difficulty is that it is impossible to predict the motion of a vehicle when the vehicle turns. That is, in the case of the foregoing conventional foregoing apparatus, the future state of a vehicle is predicted under the assumed condition that the vehicle travels straight. Thus, the linear motion model is used for the prediction on the Kalman filter. This means that it is difficult or almost impossible to grasp the vehicle's turning motion, thus lowering reliability of the prediction.

SUMMARY OF THE INVENTION

The present invention has been achieved in light of such problems. An object of the present invention is to estimate the state of a vehicle located ahead or located in the frontward field.

In order to achieve the above object, the present invention provides, as one aspect thereof, an estimation apparatus for estimating a state of a vehicle located in a frontward field which is present in front of the estimation apparatus, comprising: measurement means for measuring positional coordinates of a plurality of positions on an object to be targeted, by radiating radar waves toward the frontward field and receiving reflected radar waves from an object located ahead in the frontward field; analysis means for obtaining a position, a direction and a size of a graphical pattern by approximating the graphical pattern into a profile pattern of the object located ahead, the graphical pattern being modeled as a profile of a vehicle, a direction and a size of the graphical pattern being unknown, the profile pattern being expressed by the positional coordinates measured by the measuring means; and estimation means for estimating, as the state of the vehicle located ahead, a position of the vehicle, a direction of the vehicle, and one of a whole length and a whole width of the vehicle based on the position, the direction, and the size of the graphical pattern obtained by the analysis means.

In the present estimation apparatus, the graphic patterns, which model the profiles or the contours of outer surfaces of vehicles, are used to estimate the state of the vehicle. The vehicle state is expressed as a position of the vehicle, a direction of the vehicle, and one of a whole length and a whole width of the vehicle.

In the conventional estimation apparatus, only the positional coordinates are used to estimate the vehicle state. In contrast, in the estimation apparatus according to the present invention, not only the positional coordinates but also the graphic patterns are used for the estimation. That is, the fact that the profiles of general vehicles are similar to each other is taken into consideration in the estimation. The profiles of vehicles (four-wheel vehicles) are modeled and reference is made between the models and the measured positional results, which makes it possible to estimate the state of a vehicle which is present in the frontward field in a more accurate manner. This is helpful for increasing the accuracy of vehicle control, such as collision prevention control.

As another aspect, the present invention provides an estimation apparatus for estimating a motion state of a vehicle located in a frontward field which is present in front of the estimation apparatus, comprising: measurement means for measuring positional coordinates of a plurality of positions on a surface of an object to be targeted, by radiating radar waves toward the frontward field and receiving reflected radar waves from an object located ahead in the frontward field; and estimation means for estimating the motion state of the vehicle based on the positional coordinates measured by the measurement means and a predetermined non-linear motion model for the vehicle.

In this way, the non-linear motion model is used, while the conventional estimation apparatus employs a linear motion model for estimating the vehicle state. Hence, in the present invention, the vehicle state including the angular velocity of the vehicle can be estimated, so that it is possible to estimate the turning motion of the vehicle. This estimation is useful for performing the vehicle control according to collision prevention between vehicles.

BRIEF DESCRIPTIONS OF THE DRAWINGS

In the accompanying drawings;

FIG. 2 is a flowchart showing a vehicle-state estimating process executed by a CPU incorporated in the estimation apparatus;

Figure 4B:
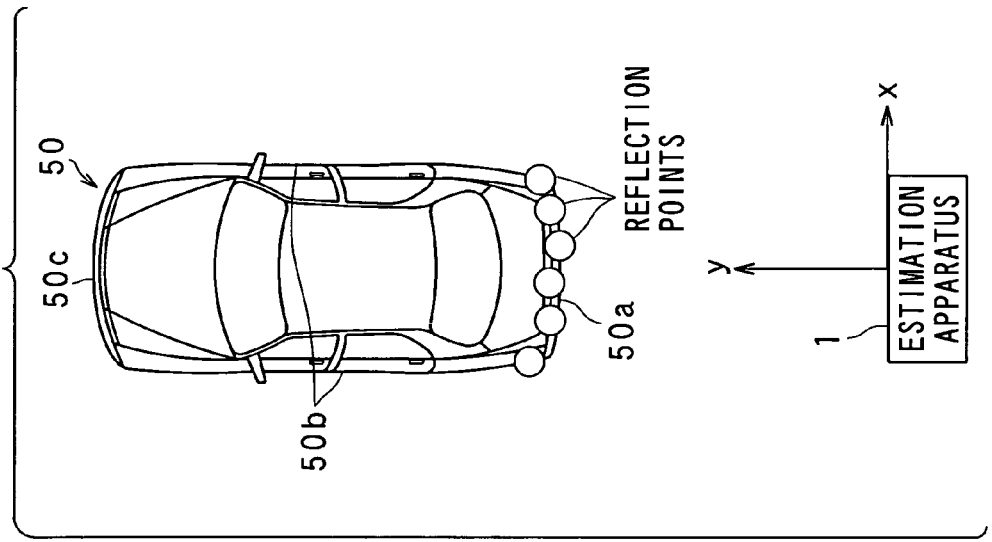
Figure 4A:
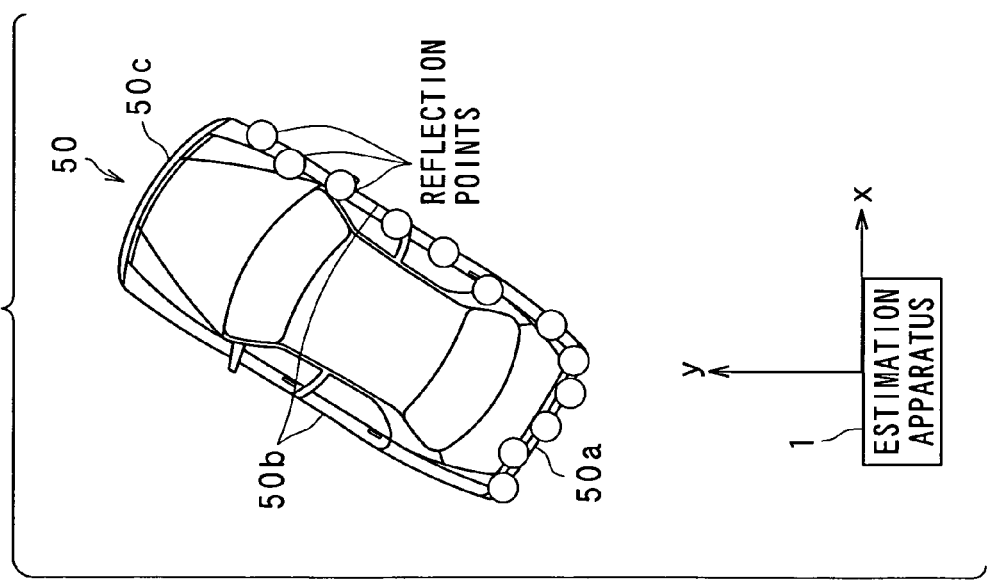
Figure 5:
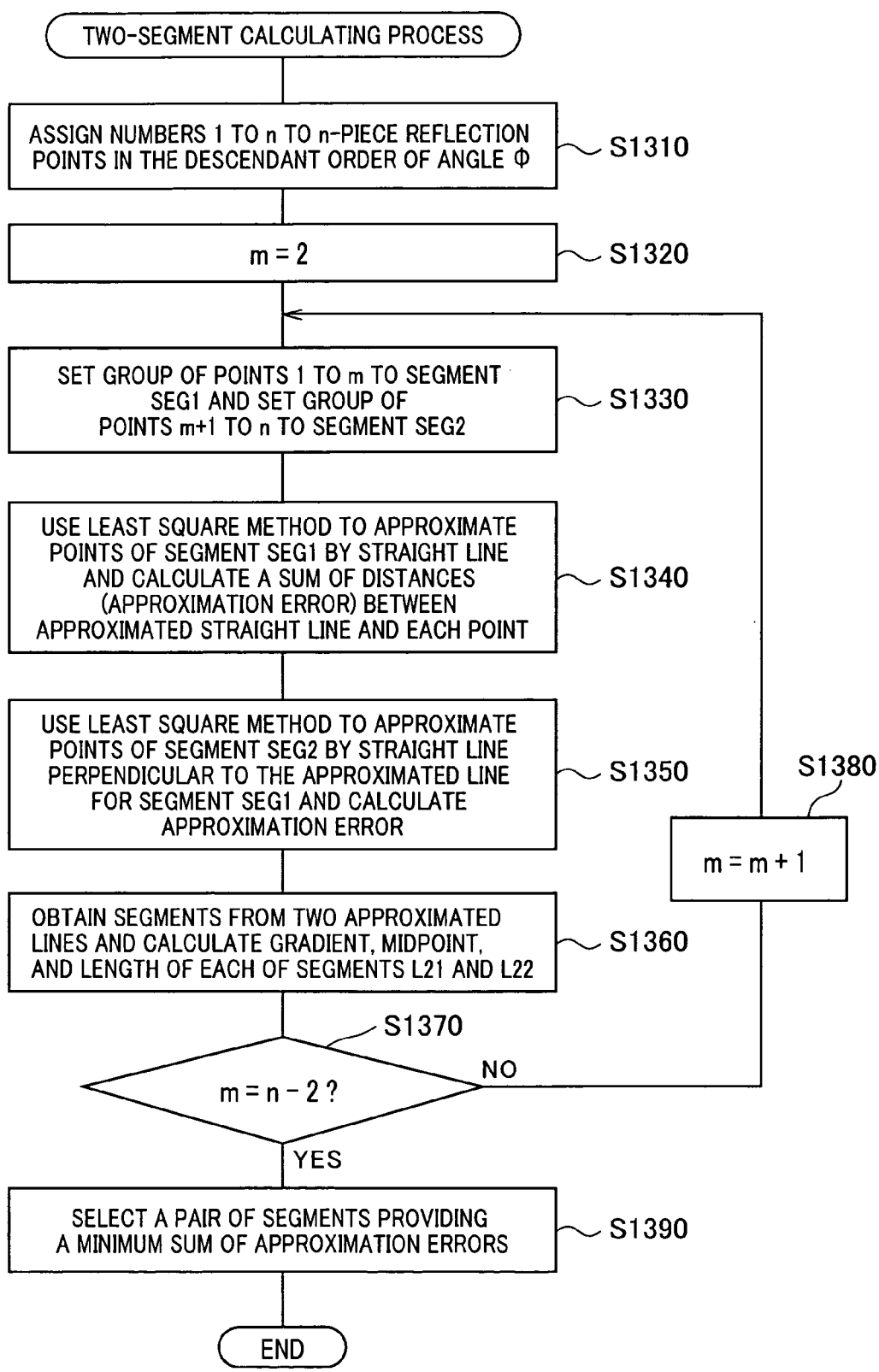
Figure 6A:
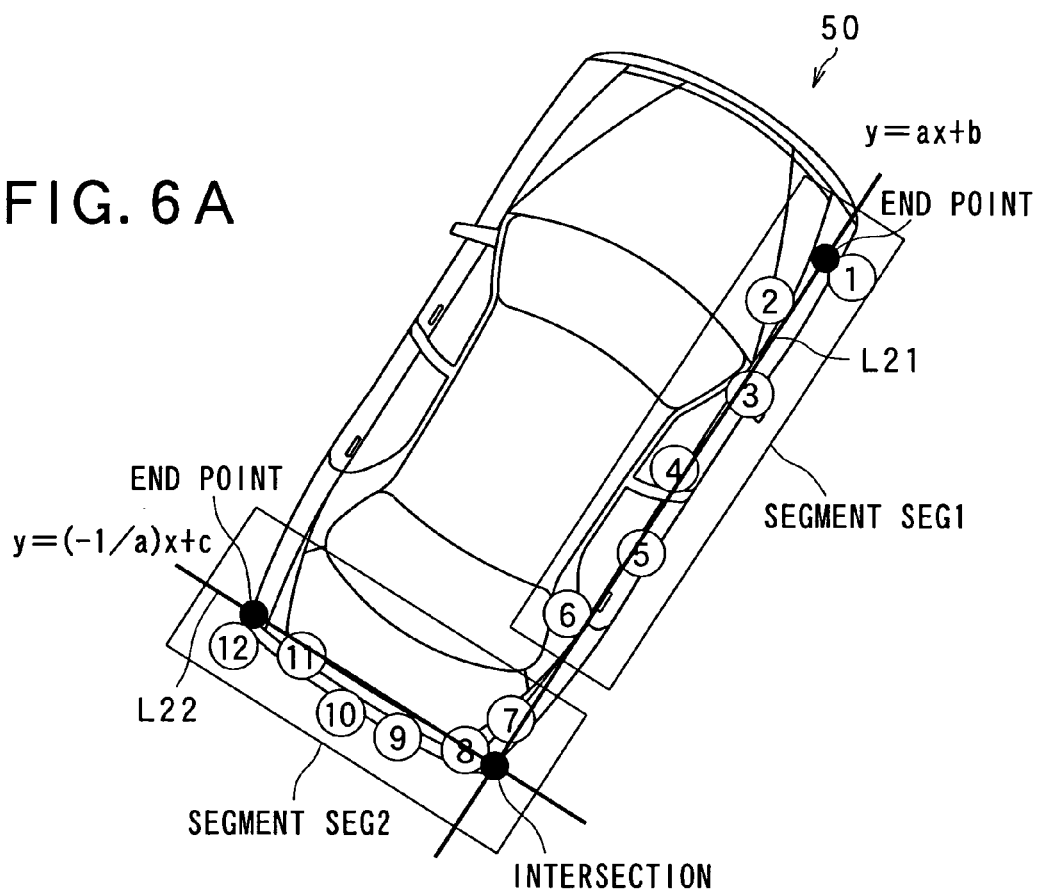
Figure 6B:
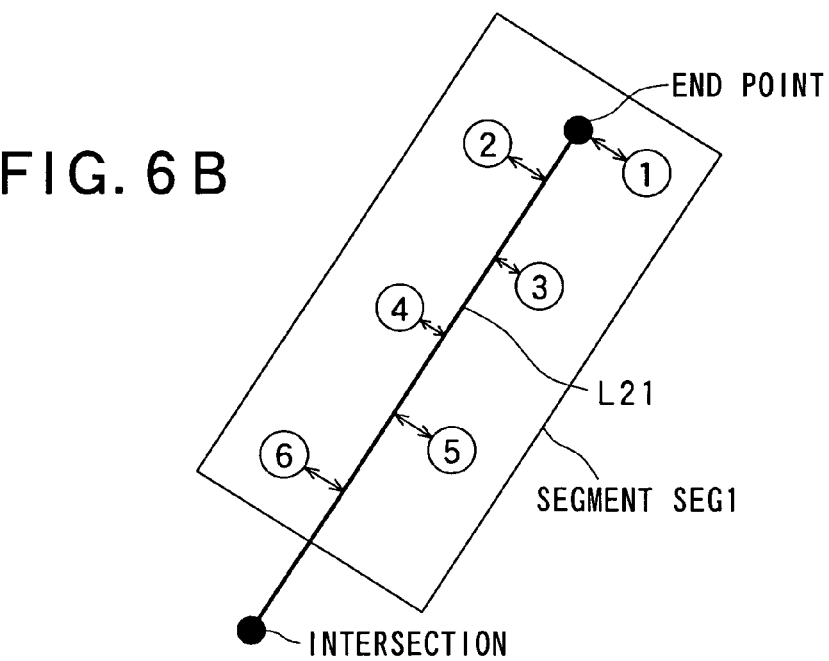
Figure 7A:
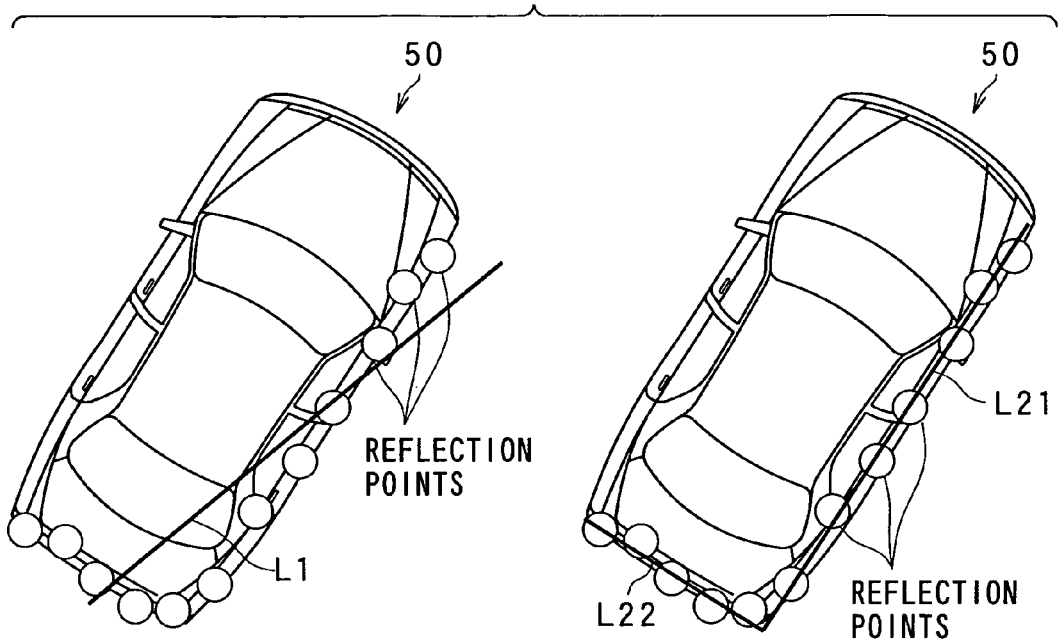
Figure 7B:
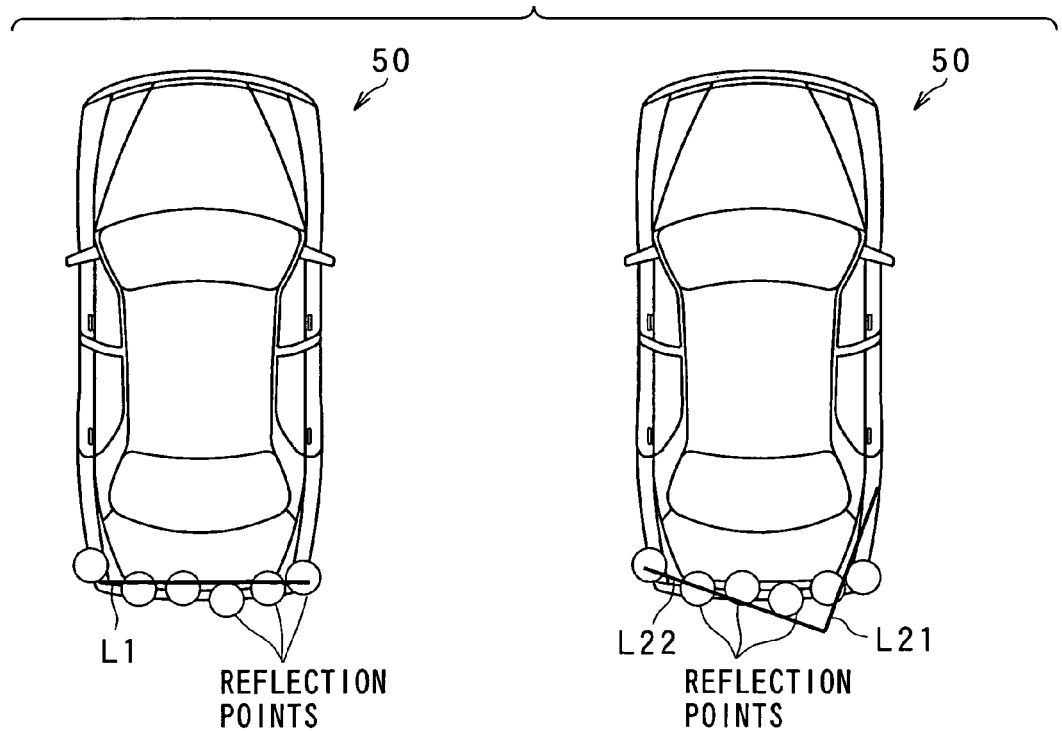
Figure 8:
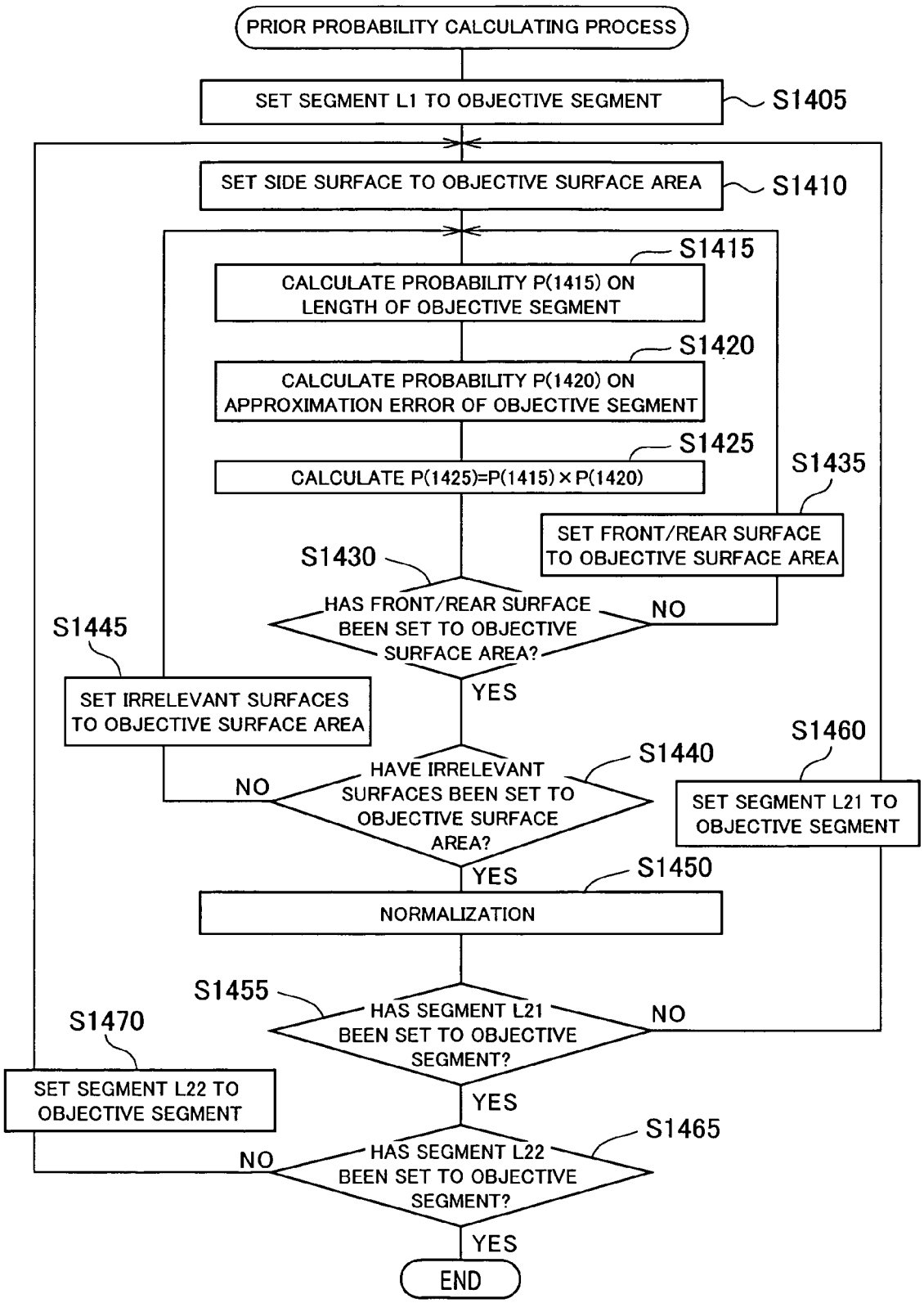
Figure 9A:
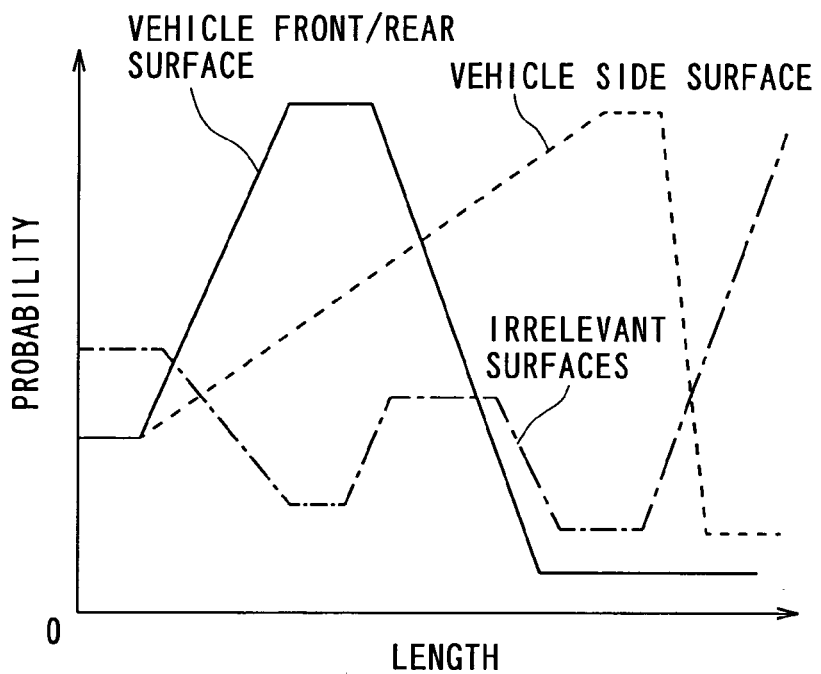
Figure 9B:
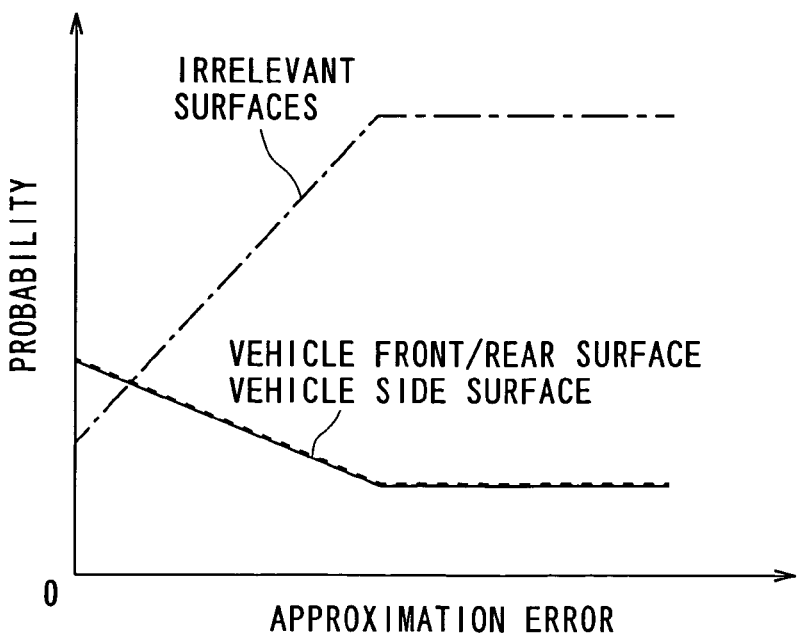
Figure 12:
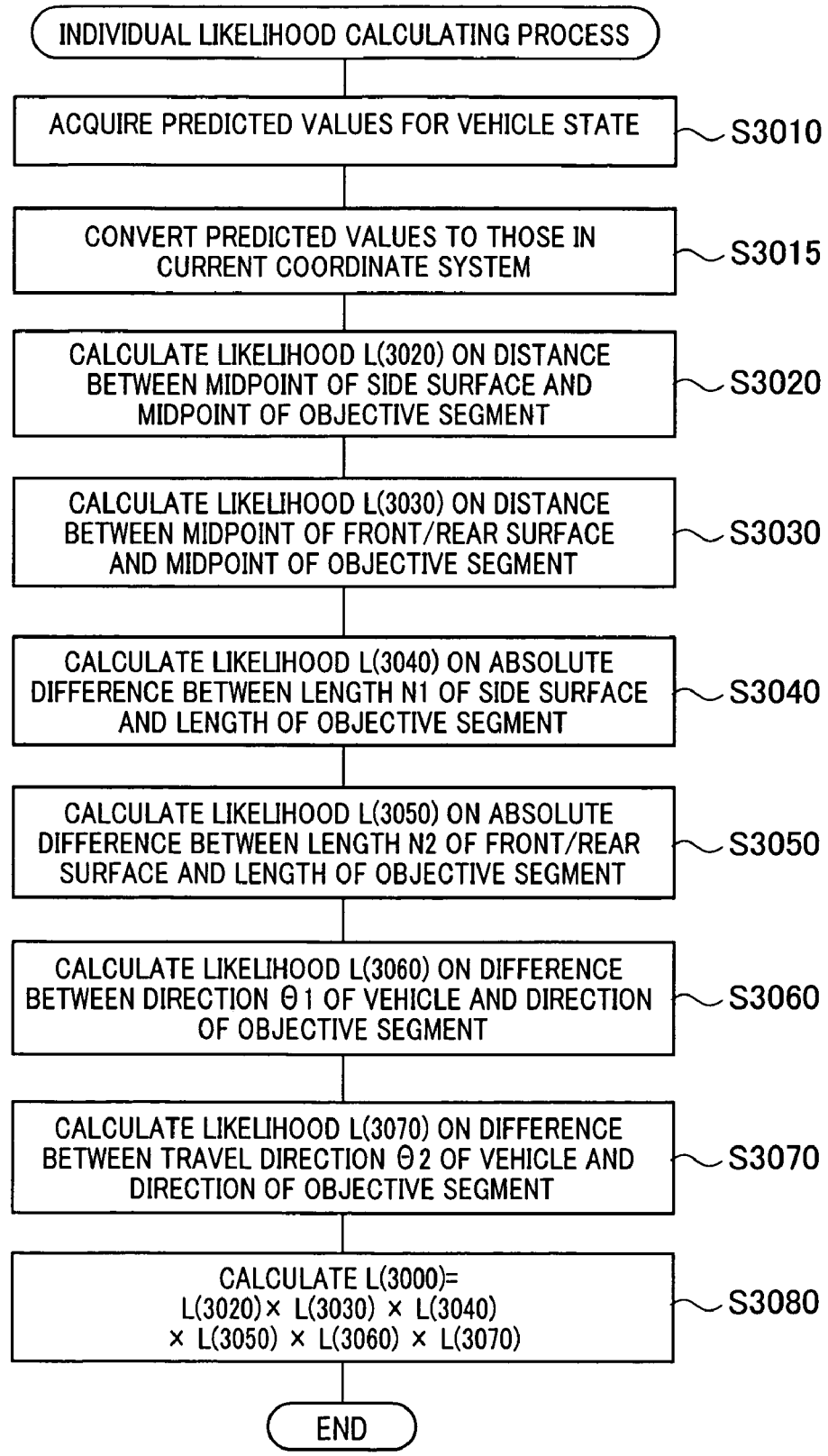
Figure 13:
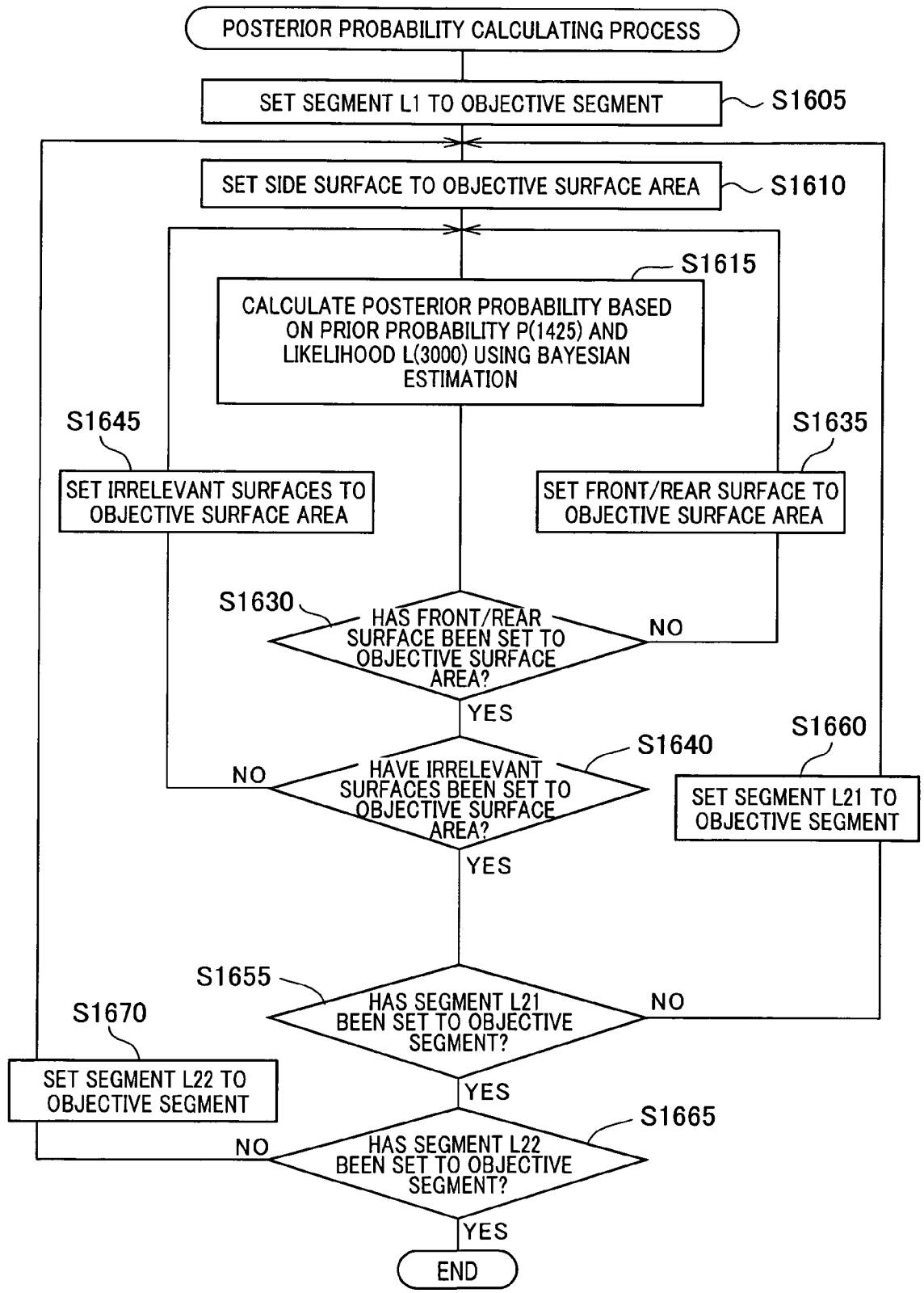
Figure 14:
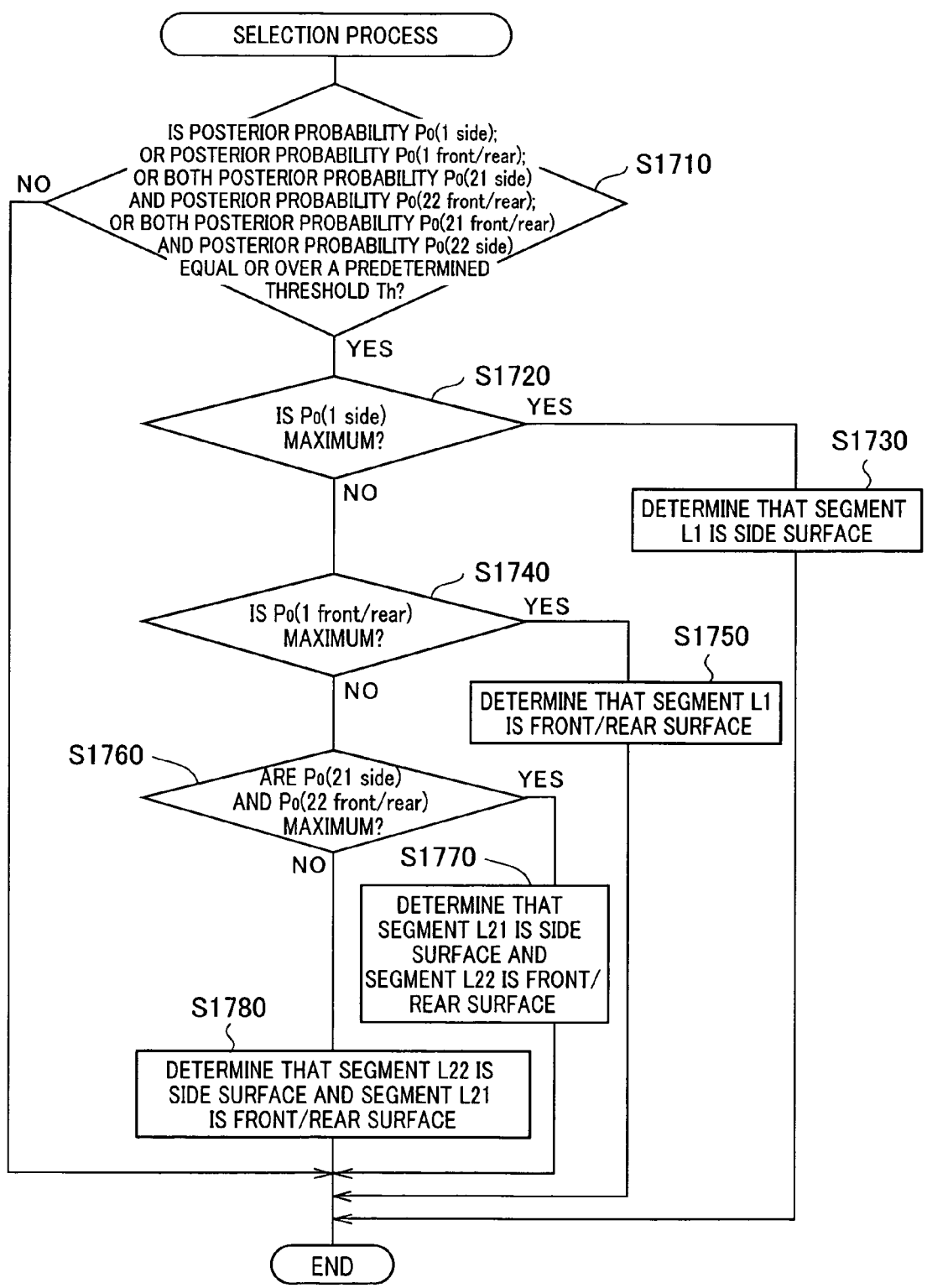
Figure 15:
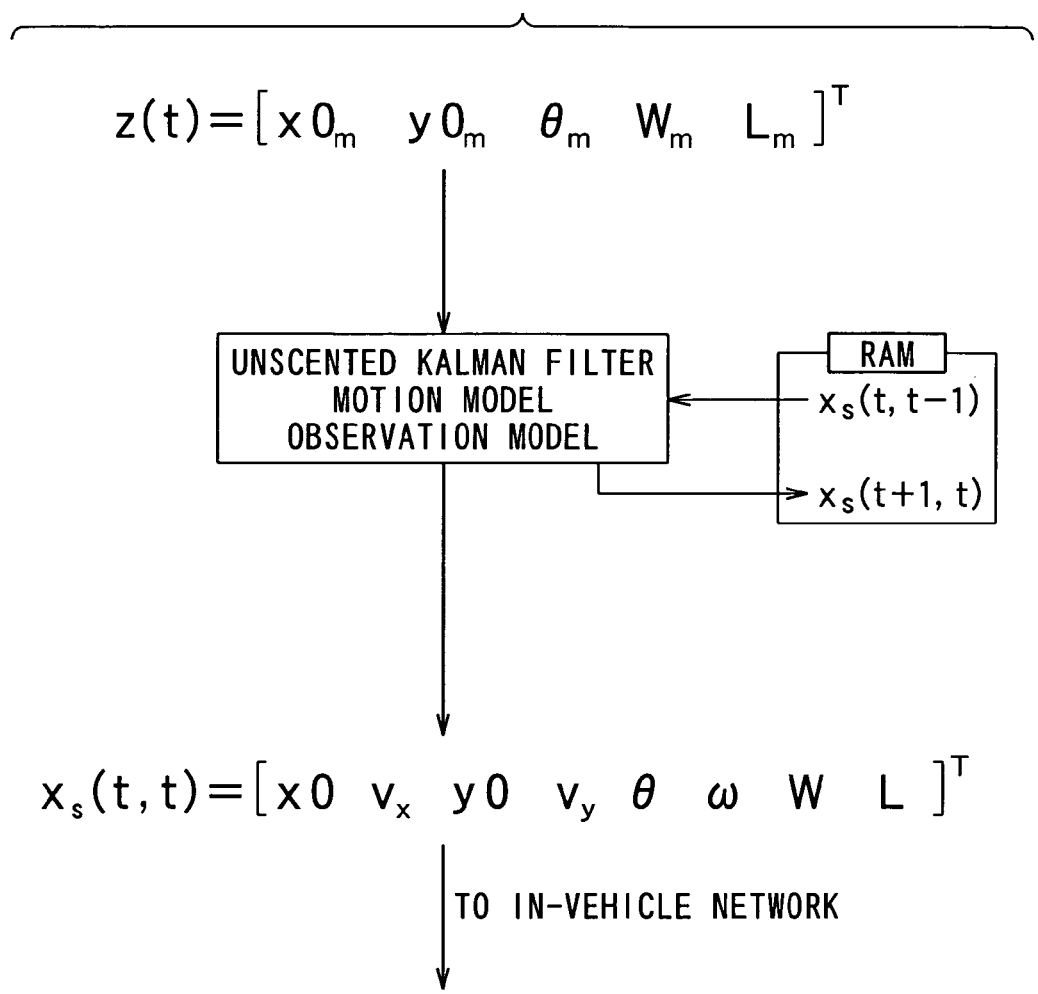
Figure 16:
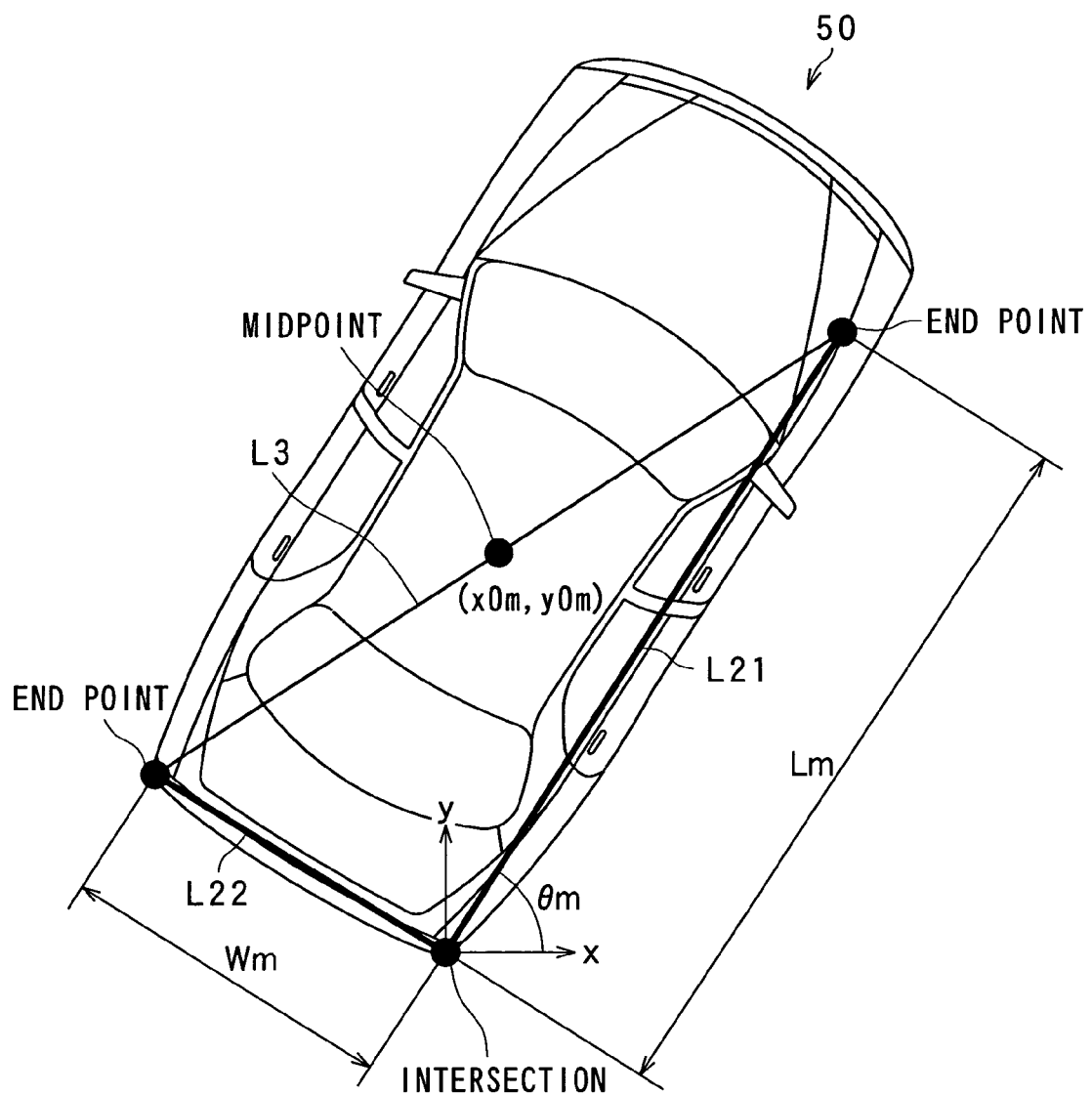
Figure 17:
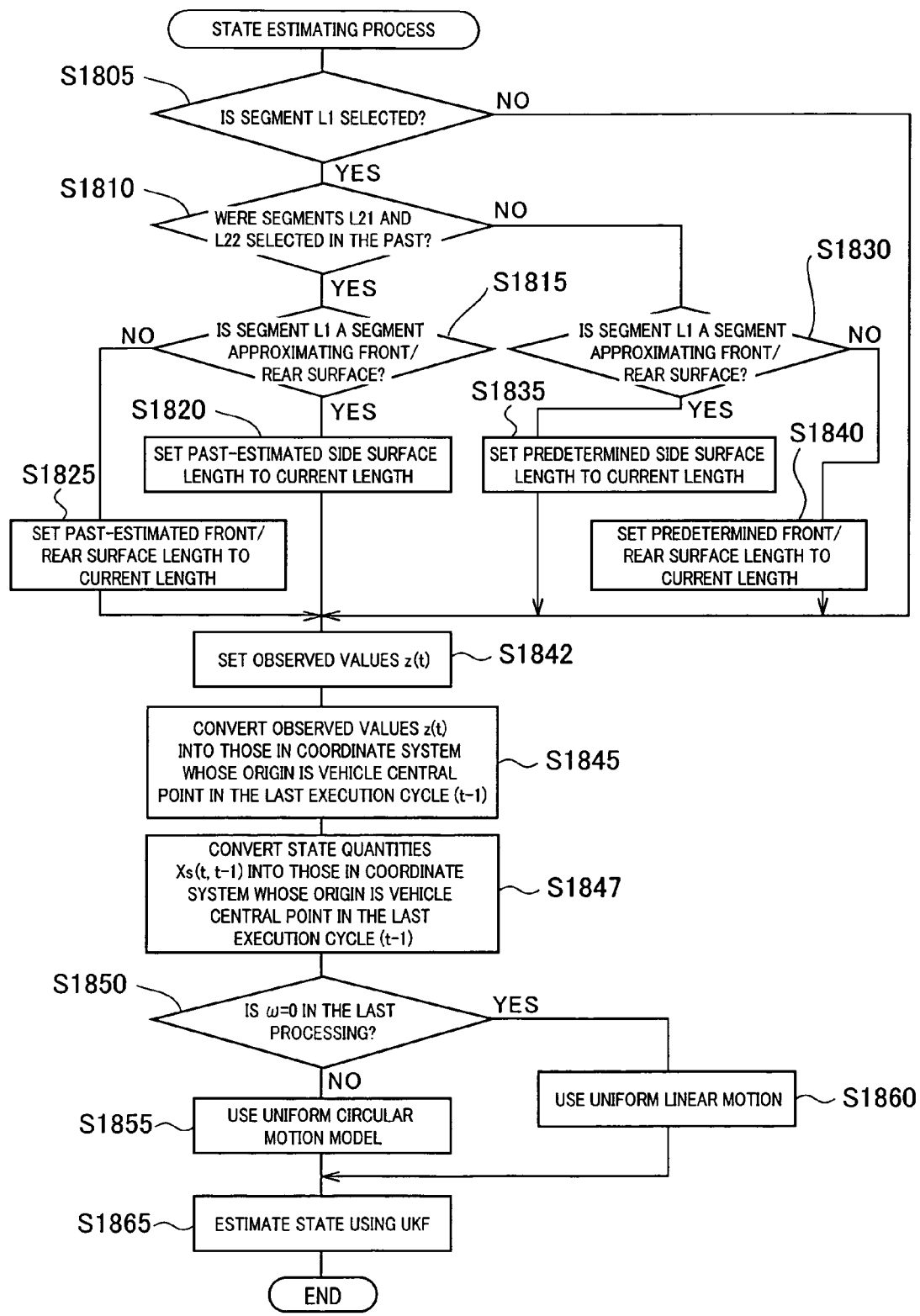

FIGS. 4A and 4B exemplify distributions of reflection points on a vehicle body;

FIG. 5 is a flowchart showing a two-segment calculating process executed by the CPU;

FIGS. 6A and 6B explain an example of the two-segment calculating process;

FIGS. 7A and 7B exemplify how to approximate reflection point profiles, i.e., vehicle profiles, using a single segment or two segments;

FIG. 8 is a flowchart showing a prior probability calculating process executed by the CPU;

FIGS. 9A and 9B are graphs showing practical examples of function data used for calculating the prior probability;

FIG. 10 is a flowchart showing a likelihood calculating process executed by the CPU;

FIGS. 11A-11F are graphs showing function data used for calculating a likelihood;

FIG. 12 is a flowchart showing an individual likelihood calculating process executed by the CPU;

FIG. 13 is a flowchart showing a posterior probability calculating process executed by the CPU;

FIG. 14 is a flowchart showing a selection process executed by the CPU;

FIG. 15 illustrates how to calculate using the Kalman filter;

FIG. 16 illustrates how to calculate the positional coordinates of a central point of a vehicle; and FIG. 17 is a flowchart showing a state estimating process executed by the CPU.

DETAILED DESCRIPTION OF THE PREFERRED EMBODIMENTS

Referring to FIGS. 1-17, an estimation apparatus according to a first embodiment of the present invention will now be described.

Figure 1:
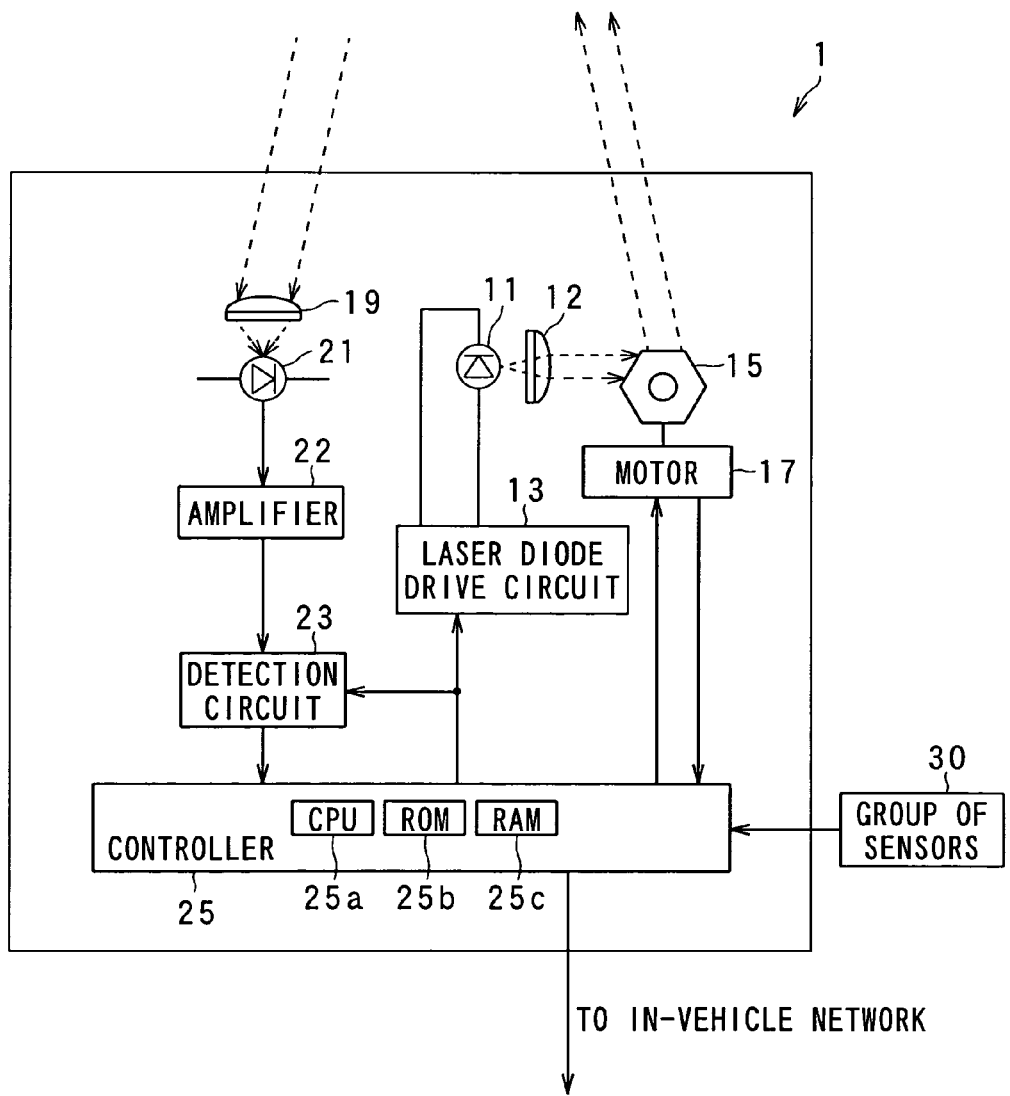
FIG. 1 is a block diagram showing the configuration of an estimation apparatus according to an embodiment of the present invention.

FIG. 1 outlines in a block form the entire configuration of an estimation apparatus 1 according to the first embodiment of the present invention. The present estimation apparatus 1 is mounted in a front part of a four-wheel vehicle.

The estimation apparatus 1 according to the present embodiment is provided, as shown in FIG. 1, a laser diode 11 emitting laser light and a collimating lens 12 producing the laser light emitted from the laser diode 11 into parallel light, in addition to a laser diode drive circuit 13, a mirror 15, a motor 17, a converging lens 19, a photodiode 21, an amplifier 22, a detection circuit 23, and a controller 25. The laser diode drive circuit 13 is configured to drive the laser diode 11 by applying drive power thereto. The mirror 15 reflects the laser light emitted from the laser diode 11. The motor 17 is configured to rotate the mirror 15, and the converging lens 19 is placed for converging the laser light. The photodiode 21 is configured to receive the laser light converged by the converging lens 19 to produce an electric signal corresponding the received laser light. The amplifier 22 is placed to amplify the electric signal from the photodiode 21.

The detection circuit 23 is configured to receive both a drive signal for the laser diode 11 and a signal from the amplifier 22 and to detect a period of time ranging from the emission of the laser light from the laser diode 11 to the detection of the laser light at the photodiode 21. In addition, the controller 25 is configured to provide the laser diode drive circuit 13 with the drive signal and to provide the motor 17 with a motor drive signal. The controller 25 is also configured to control the rotation of the motor 17 as well as the emission of the laser light, and to perform various types of processes on the basis of both information about a rotational position supplied from the motor 17 and information about a period of travel time $\Delta T$ of the laser light supplied from the detection circuit 23.

The laser diode 11 is a device to emit the laser light serving as radar waves for detecting a vehicle located ahead (i.e., a vehicle located in a frontward field extending from the vehicle provided with the present estimation apparatus 1). The laser light has a high directivity, so that the present apparatus is able to have a high spatial resolution. The collimating lens 12 is placed to bend the laser light, which is emitted to be diffused from the laser diode 11, into a parallel beam of light.

The mirror 15 is a polygon mirror having a hexagonal reflection plane to reflect light. The motor 17 is driven by a drive signal coming from a CPU 25a so that the mirror 15 is rotated. In the estimation apparatus 1 according to the present embodiment, the above configuration for the light allows the laser light passing through the collimating lens 12 to travel along desired directions.

The controller 25 is provided with, in addition to the CPU 25a, a ROM 25b and a RAM 25c, so that the controller 25 serves as a computer. The ROM 25b stores programs for various types of processes, which are prepared in advance. Hence, when being activated, the CPU 25a reads in data of the programs form the ROM 25b and performs the programs, which makes it possible to control the operations of both the laser diode 11 and the motor 17 and to estimate states of objects reflecting the laser light based on the Information about the rotational position of the motor and the travel time period $\Delta T$ of the laser light.

FIG. 2 shows a flowchart for a vehicle-state estimating process, which is repeated by the CPU 25a at predetermined execution intervals (or predetermined control intervals, i.e., at a predetermined repetition time). Of course, this repeated process is associated with the operations of other members in the controller 25. In the present estimation apparatus 1, objects located ahead, which are sensed by the laser light, are regarded as four-wheel vehicles, and the following process is executed.

When the vehicle-state estimating process is started, the CPU 25a commands to emit a beam of laser light and receive a reflected beam of laser light such that reflected positions of the laser light are measured, whereby their positional coordinates can be obtained (step S110). Specifically, with the drive circuit 13 and the motor 17 driven so that the mirror is rotated in a controlled manner, the laser diode 11 is driven to intermittently emit pulsed light. This allows the emitted laser light to be emitted toward objects located ahead, with the emission angle changed in the horizontal direction of the apparatus-mounted vehicle.

The laser light, which has been reflected by the objects, is received by the photodiode 21 through the converging lens 19 in the converging manner. The received laser light is converted to an electrical signal at the photodiode 21, amplified in power by the amplifier 22, and sent to the detection circuit 23.

The detection circuit 23 is configured to receive a laser-diode drive signal, which comes from the CPU 25a as the drive signal for the laser diode drive circuit 13. Hence, the detection circuit 23 is able to detect a time period (a delay time ΔT: refer to FIG. 3A) from the emission of the laser light emission to the reception thereof on the basis of input timing of this drive signal and light reception timing of the reflected light.

Every time the pulsed light is emitted, the detection circuit 23 responds by providing the delay time ΔT therefrom to the CPU 25a, so that the CPU 25a uses the velocity v of the laser light to calculate a distance D to each reflection point based on D=v·ΔT/2. Further, using the calculated distance D and an emission angle φ of the pulsed light which has been subjected to the distance measurement, the CPU 25a calculates, as the positional coordinate (x, y) of each reflection point, (x, y)= (D·sin φ, D·cos φ). Incidentally, the x-y coordinate used herein is a relative coordinate system of which reference is the estimation apparatus 1 fixed to the vehicle. In the present embodiment, this relative coordinate system is refereed to as a "coordinate system A."

Figure 3A:
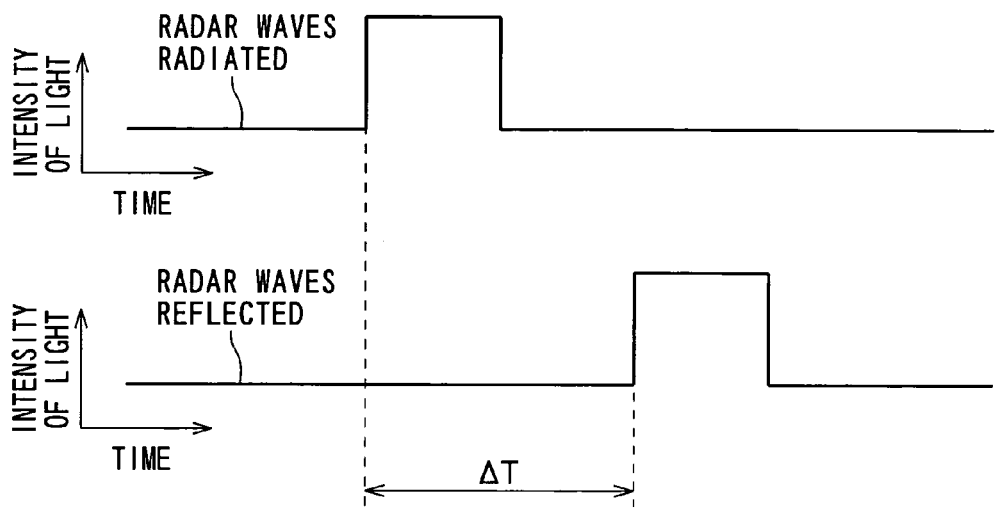
FIGS. 3A and 3B illustrate the criterion to measure distances using radar waves and how to obtain the positional coordinate of an object.
Figure 3B:
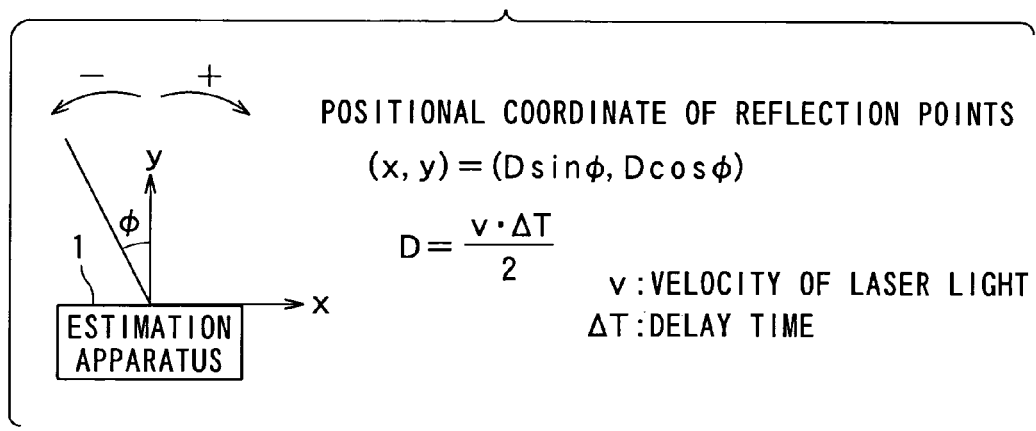

The emission angle φ of the pulsed light can be obtained uniquely based on the rotation position of the motor 17. As shown in FIG. 3B, assume that the estimation apparatus 1 is installed on an anteroposterior (longitudinal) axial line of the vehicle, the y-axis extends forward from this axial line, and an angle φ is defined from the y-axis serving as a reference axis. Thus (x, y)=(D·sin φ, D·cos φ) can be calculated as the positional coordinate of each reflection point.

FIGS. 4A and 4B show practical examples of the reflection points whose positional coordinates (x, y) can be obtained by the above measurement. FIG. 4A shows a distribution of reflection points measured along surfaces of a vehicle 50 located ahead, which is oblique to the estimation apparatus 1. In contrast, FIG. 4B shows a distribution of reflection points measured along a rear surface 50a of a vehicle 50 located ahead, which rear surface 50a directly faces the estimation apparatus 1. In addition, a side surface 50b or a frontal surface 50c of the vehicle located ahead may also directly face the emission apparatus 1. In such cases, the distribution of the reflection points becomes similar to the case shown in FIG. 4B.

In this way, as step S110, the positional coordinates of plural points on a surface(s) of each object located ahead. After this, the CPU 25a uses a method of least squares to apply a single line to be fit to a profile pattern of each object expressed by the plural-point positional coordinates (i.e., the positional coordinates of the reflection points). Obtaining end points of an approximate line allows the profile pattern of the object located ahead to be approximated by a single segment. Hereinafter, this approximate segment is referred to as a segment L1. In addition, the segment L1 is subjected to calculation of the length thereof, the positional coordinate of a midpoint thereof, and an approximation error (step S120). The approximation error is a sum of the distances between the segment L1 and each of the reflection points composing the profile pattern.

When it is not possible to obtain the positional coordinates of four or more reflection points at step S110, the CPU 25a temporarily stops this vehicle-state estimating process without proceeding to step S120, and restarts the measurement at step S110 after a predetermined repetition time.

When completing the calculation at step S120, the CPU 25a executes an L-shaped two-segment calculating process (step S1300). That is, the profile pattern of each object located ahead, which is expressed by plural reflection points, is subjected to the method of least squares so that the profile pattern is fit with two segments perpendicular to each other to produce an L-shape.

By obtaining both ends of each segment, the profile pattern of each object can be approximated with an L-shaped graphic pattern which models the frontal/rear surface of a vehicle and a side surface of the vehicle and which consists of the two mutually-perpendicular segments whose ends are connected to each other. In the foregoing coordinate system A, the length of each segment composing this approximate graphic pattern, the direction of each segment thereof (i.e., an angle between each segment and the x-axis in the coordinate system A), and the positional coordinate of a midpoint of each segment are then calculated.

FIG. 5 shows a flowchart for the L-shaped two-segment calculating process executed by the CPU 25a at step S1300.

In the two-segment calculating process, the CPU 25a assumes that number of reflection points obtained at step S110 is n-pieces (n>3) and assigns the numbers N to the reflection points in the descending order of the size of the angle φ (step S1310). Specifically, the numbers N are related to the positional coordinates of the reflection points, which are stored as actual data.

The numbers N can be assigned according to a way shown in FIG. 6A. The numbers N, i.e., N=1, 2, 3, . . . , n−1, n, are assigned in sequence to the reflection points lining up in the descending order of the size of the angle φ, respectively. N=1 is assigned to the first reflection point having the largest angle, N−2 is assigned to the second refection point having the second largest angle, and so on.

After this assignment at step S1310, the CPU 25a sets 2 to a variable m (i.e., m=2) (step S1320). Then, the reflection points assigned to N=1 to m are set to a first segment SEG1, while the reflection points assigned to N=m+1 to n are set to a second segment SEG2 (step S1330).

Then the CPU 25a applies the method of least squares to a group of reflection points belonging to the first segment SEG1 to approximate those reflection points by a straight line, so that an approximate line L21 for those reflection points can be calculated (step S1340). Moreover, the CPU 25a calculates distances from the approximate line L21 to the respective reflection points belonging to the segment SEG1 and then calculates a sum of those distances as an approximation error (also at step S1340).

FIG. 6B explains how to calculate the distances between the approximate line L21 and the respective reflection points. FIG. 6B also shows practical examples of how the reflection points belonging to the segment SEG1 are mapped and how the approximate line L21 is. In FIG. 6B, the shortest distance, shown by each arrow, between each of the reflection points and the approximate line L21 is calculated to obtain a sum of the distances as an approximation error for the segment SEG1.

The processing is then shifted to step S1350, where the CPU 25a applies the method of least squares to a group of reflection points belonging to the other second segments SEG2 to produce an approximate straight line L22 which is perpendicular to the line obtained at step S1340. Also the CPU 25a calculates the distances between the approximate line L22 and the respective reflection points belonging to the segment SEG2 and calculates a sum of those distances as an approximation error.

FIG. 6A illustrates how to obtain the approximate lines L21 and L22 as to n=12 and m=6. As shown therein, in the present embodiment, the method of least squares is applied to the first to sixth reflection points to the first segment SEG1 to obtain an approximate line. When this approximate line is expressed by a liner expression of y=ax+b, the approximate line to the second segment SEG2 becomes y=−(1/a)x+c, because both the segments SEG1 and SEG2 are perpendicular to each other. Hence, the parameters "a" and "b" are calculated at step S1340, and a parameter "c" is calculated at step S1350.

At step S1360, the positional coordinates of both ends of each of the paired approximate lines L21 and L22 are calculated. Each approximate line is then segmented, and the segmented lines are produced into an L-shaped graphic pattern in which the segmented lines extracted the approximate lines L21 and L22 are connected to each other to form an L-shape. This L-shaped graphic pattern is treated as an approximate graphic pattern that corresponds to the profile pattern of each object located in front of the apparatus 1. Further, the length and direction of each segment composing this approximate graphic pattern, and the positional coordinate of a midpoint of each segment in the coordinate system A are calculated (step S1360).

How to calculate the positional coordinates of both ends is as follows. First, the positional coordinate of an intersection of both lines L21 and L22 is calculated as that of one end of each line. As shown in FIG. 6B, the positional coordinate of an intersection at which a perpendicular line extending from the N=1 assigned reflection point to the line L21 and the line L21 intersects to each other is calculated as the positional coordinate of the other end of the line L21. In the similar manner, the positional coordinate of an intersection at which a perpendicular line extending from the N=n assigned reflection point to the line L22 and the line L22 intersects to each other is calculated as the positional coordinate of the other end of the line L22. In this way, the positional coordinates of both ends of each approximate line L21 (L22) are obtained for segmentation, so that the length and direction of each segment and the positional coordinate of a midpoint of each segment can be acquired (step S1360).

When completing the calculation at step S1360, it is determined by the CPU 25a whether or not m=n−2 is achieved (step S1370). If this condition is not met (NO at step S1370), the process is shifted to step S1380, where m is incremented (that is, m=m+1), before returning the process to step S1330.

Meanwhile, when it is determined that the condition of m=n−2 is met (YES at step S1370), from the "n−3" pairs of segments L21 and L22 which are calculated so far, one pair of segments L21 and L22 providing the least sum of both approximation errors of the two segments SEG1 and SEG2 is pick up. And an L-shaped graphic pattern composed of the one pair of picked-up segments L21 and L22 is finally decided as an L-shaped approximate graphic pattern for the group of the reflection points (that is, the profile pattern of each object located ahead) measured at step S110 (step S1390). The two-segment calculating process is then ended.

In this way, the profile pattern of each object, which is expressed by the group of reflection points measured at step S110, is approximated by a graphic pattern consisting of a single segment modeling one side surface of the vehicle (object) and an L-shaped graphic pattern consisting of one pair of mutually-perpendicular segments (one end of each of which is connected to each other to form an L-shape) modeling the front/rear (i.e., front or rear) surface and one side surface. Hence an approximate graphic pattern (precisely, the length and direction of each segment and the positional coordinate of a midpoint of each segment) is obtained.

FIGS. 7A and 7B exemplify an approximate graphic pattern consisting of a single straight segment L1, which is calculated at step S120, and an L-shaped approximate graphic pattern consisting of two segments L21 and L22, which is calculated at step s1300.

More specifically, the left figure in FIG. 7A shows an approximate graphic pattern consisting of a single segment L1 calculated at step S120 as for the map of the reflection points measured as shown in FIG. 4A. The right figure in FIG. 7A shows an L-shaped approximate graphic pattern consisting of the two segments L21 and L22, which is calculated at step S1300 for the reflection point map shown in FIG. 4A.

The left figure in FIG. 7B shows an approximate graphic pattern consisting of a single segment L1 calculated at step S120 as for the map of the reflection points measured as shown in FIG. 4B. The right figure in FIG. 7B shows the L-shaped approximate graphic pattern consisting of the two segments L21 and L22, which is calculated at step S1300 for the reflection point map shown in FIG. 4B.

On completion of the two-segment calculating process at step S1300 in FIG. 2, the CPU 25a shifts its processing to step S1400 to execute a prior probability calculating process shown by a flowchart in FIG. 8.

In the present embodiment, as to each of the segments L1, L21 and L22 calculated at steps S120 and S1300, a Bayesian estimation method is used to calculate a probability that each segment is a segment approximating the front/rear surface of a vehicle, a probability that each segment is a segment approximating a side surface of the vehicle, and a probability that each segment is a segment which approximates neither a side surface nor the front/rear surface (hereinafter called "the irrelevant segments (or other segments)"). For obtaining these probabilities, step 1400 is provided, where it is examined that each of the segments L1, L21 and L22, which are used as inputs to the Bayesian estimation, is subjected to calculation to examine that each segment gives how much prior probability to a segment approximating the vehicle front/rear surface, how much prior probability to a segment approximating a vehicle side surface, and how much prior probability showing the irrelevant segments (other segments). This calculation is carried out using function data (map or others) previously recorded in the ROM 25b.

Prior to explaining the prior probability calculating process in FIG. 8, the structure of the function data used in the prior probability calculating process will now be explained with reference to FIGS. 9A and 9B. FIGS. 9A and 9B are graphs each visualizing the structure of the function data stored in the ROM 25b.

In FIG. 9A, the length of each segment is employed as an input for the function data expressed by three graphs. The three graphs show a probability that a segment designated by an inputted length approximates the vehicle front/rear surface, a probability that a segment designated by an inputted length approximates a vehicle side surface, and a probability that a segment designated by an inputted length is one of the irrelevant segments. Using these graphs, a calculated probability is outputted.

In FIG. 9B, the approximation error of each segment is employed as an input for the function data expressed by two graphs. The two graphs show a probability that a segment designated by an inputted approximation error approximates the vehicle front/rear surface, a probability that a segment designated by an inputted approximation error approximates a vehicle side surface, and a probability that a segment designated by an inputted approximation error is one of the irrelevant segments. Using these graphs, a calculated probability is outputted.

In the graph of FIG. 9A, the longitudinal axis shows the probability and the lateral axis shows the length of each segment as an input parameter, while in the graph of FIG. 9B, the longitudinal axis shows the probability and the lateral axis shows the approximation error of each segment. In each of FIGS. 9A and 9B, a dashed line denotes changes in the probability of "a vehicle side surface," changes in the probability of a solid line denotes "the vehicle front/rear surface," and a dashed-dotted line denotes changes in the probability of "the irrelevant segments."

These function data can be designed freely by designers. However, since the longitudinal axis denotes the probability, it is normal to design the function data shown in each of FIGS. 9A and 9B such that a sum of the three probabilities of being segments approximating the vehicle front/rear surface, a vehicle side surface, and the irrelevant segments is constant. Incidentally the sum is not always designed to be 1, but may be set to other values other than 1 as long as the sum is constant and the probabilities are subjected to normalization. Adding the normalization makes it possible to perform a calculation in the Bayesian estimation, which calculation is identical to the calculation carried out under the condition that the sum is 1.

In the present embodiment, as shown in FIG. 9A, the function data are set such that the probability takes the shape of a vehicle into consideration. Practically, in a range of shorter segment lengths, the probability that a segment designated by an inputted length approximates the vehicle front/rear surface becomes higher, whilst in a range of longer segment lengths, the probability that a segment designated by an inputted length approximates a vehicle side becomes higher. In addition, when segment lengths are longer than the whole length of the vehicle which is longer than the usually conceivable lengths, the probability that the segment designated by an inputted length is one of the irrelevant segments becomes higher.

Practically the probability that a segment approximates the vehicle front/rear is set to have a peak in a range where the segment length equals lengths, corresponding to the whole widths of general vehicles. In contrast, the probability that a segment approximates a vehicle side is set to have a peak in a range where the segment length equals corresponding to the whole lengths of general vehicles.

Furthermore, as shown in FIG. 9B, in a range where the approximation error becomes smaller, the probability that a segment approximates the vehicle front/rear surface and the probability that a segment approximates a vehicle side surface are higher. By contrast, as the approximation error becomes larger, the probability that a segment belongs to the irrelevant segments also becomes higher.

The CPU 25a reads the functional data from the ROM 25b and, for each of the segments L1, L21 and L22, uses a segment length or an approximation error to calculate a prior probability that a segment approximates the vehicle front/rear surface, a prior probability that a segment approximates a vehicle side surface, and a prior probability that a segment belongs to irrelevant segments.

Next, referring to FIG. 8, how the prior probability calculating process is executed at step 1400 by the CPU 25a will now be described.

In this process, the COU 25a first sets a segment L1 obtained at step S120 as a segment to be objective (hereinafter called "objective segment") for the calculation at the following steps (step S1405). Furthermore, a vehicular "side surface" is set as a vehicular surface area to be objective (hereinafter called "objective surface area") for the calculation at the following steps (step S1410).

Using the function data shown in FIG. 9A, a probability P(1415) that the objective segment is a segment approximating the objective surface area is calculated depending on the length of the objective segment (step S1415). The function data shown in FIG. 9B are then used to calculate a probability P(1420) that the object segment is a segment approximating the objective surface area depending on the approximation error of the objective segment (step S1420). A probability P(1425) is then calculated on a formula of P(1425)=P(1415)× P(1420) (step S1425).

Next, it is determined whether or not, as for the current objective segment, the probability P(1425) for the objective surface area which is the vehicle front/rear surface has been calculated (step S1430). If it is determined that the probability P(1425) for the vehicle front/rear surface has not been calculated yet (NO at step S1430), the current objective surface area is updated to "the front/rear surface," before returning the processing to step S1415 (step S1435).

By contrast, if it is determined that the probability P(1425) for the vehicle front/rear surface has been calculated (YES at step S1430), it is further determined whether or not the probability P(1425) for the irrelevant surfaces has been calculated as to the current objective segment (step S1440). When this determination shows that the probability P(1425) for irrelevant surfaces has not been calculated as for the current objective segment (NO at step S1440), the objective surface area is updated to one of "the irrelevant surfaces" (step S1445), before returning to step S1415. When the objective surface area is an irrelevant surface, the probability that the objective segment belongs to the irrelevant segments is calculated at step S1425.

In contrast, if it is determined that the probability P(1425) for the irrelevant segments has already been calculated (YES at step S1440), the probability P(1425) for the side surface, the probability P(1425) for the front/rear surface, and the probability P(1425) for the irrelevant segments are normalized such that a sum of the three probabilities is set to 1. Hence a prior probability P(1425) that the objective segment approximates the vehicle front/rear surface, a prior probability P(1425) that the objective segment approximates a vehicle side surface, and a prior probability P(1425) the objective segment belongs to the irreverent segments are obtained individually (step S1450).

In other words, the normalized probability P(1425) for the vehicle front/rear surface is designated as the prior probability P(1425) that the objective segment is a segment approximating the vehicle front/rear surface and the prior probability P(1425) is used in the succeeding steps. Similarly, the normalized probability P(1425) for the vehicle side face is designated as the prior probability P(1425) that the objective segment is a segment approximating the vehicle side surface. The normalized probability P(1425) for the irrelevant surfaces is designated as the prior probability P(1425) that the objective segment is a segment belonging to the irrelevant segments.

After the normalization at step S1450, the CPU 25a sets the first segment L21 to the objective segment to determine whether or not the probability P(1425) has been calculated (step S1455). If the determination at step S1455 is NO, the objective segment is updated to the first segment L21 (step S1460), before returning to step S1410.

In contrast, if the determination at step S1455 is YES, that is, the probability P(1425) for the first segment L21 has been obtained, the objective segment is updated to the second segment L22 to determine whether or not the probably P(1425) for the second segment L22 has been calculated (step S1465). If the determination thereat is NO, the objective segment is updated to the second segment L22 (step S1470), before returning to step S1410.

When the probability P(1425) for the second segment L22 has already been calculated (YES at step S1465), this prior probability calculating process is ended.

In the following, the prior probability P(1425) that the segment L1 obtained through the prior probability calculating process is a segment approximating a vehicle side surface is denoted as a prior probability P(1 side). Similarly, the prior probability P(1425) that the segment L1 is a segment approximating the vehicle front/rear surface is denoted as a prior probability P(1 front/rear), and the prior probability P(1425) that the segment L1 belongs to the irrelevant segments is denoted as a prior probability P(1 irrelevant).

This notation is also true of the segments L21 and L22. The prior probability P(1425) that the segment L21 is a segment approximating a vehicle side surface is denoted as a prior probability P(21 side), the prior probability P(1425) that the segment L21 is a segment approximating the vehicle front/rear surface is denoted as a prior probability P(21 front/rear), and the prior probability P(1425) that the segment L21 belongs to the irrelevant segments is denoted as a prior probability P(21 irrelevant). In the same manner as the above, the prior probability P(1425) that the segment L22 is a segment approximating a vehicle side surface is denoted as a prior probability P(22 side), the prior probability P(1425) that the segment L22 is a segment approximating the vehicle front/rear surface is denoted as a prior probability P(22 front/rear), and the prior probability P(1425) that the segment L22 belongs to the irrelevant segments is denoted as a prior probability P(22 irrelevant).

The prior probability calculating process at step S1400 is followed by a likelihood calculating process at step S1500, which is also carried out by the CPU 25*a* on a flowchart shown in FIG. 10.

In the likelihood calculating process according to the present embodiment, calculated are likelihoods L(1 side), L(1 front/rear), L(1 irrelevant); L(21 side), L(21 front/rear), L(21 irrelevant); and L(22 side), L(22 front/rear), L(22 irrelevant), which respectively correspond to the prior probabilities P(1 side), P(1 front/rear), P(1 irrelevant); P(21 side), P(21 front/rear), P(21 irrelevant); and P(22 side), P(22 front/rear), P(22 irrelevant) and which are used as inputs to the Bayesian estimation. This calculation uses function data for the likelihood calculation, which is previously stored in the ROM 25*b*. Prior to explaining the likelihood calculating process, FIG. 11 is used to explain how the function data for the likelihood calculation are structured and recorded in the ROM 25*b*.

FIGS. 11A to 11F show graphs which visualize the structures of function data stored In the ROM 25*b* for calculating the likelihoods. In those graphs, the likelihood is given to the longitudinal axis and the dashed, solid and dashed-dotted lines denote changes in a vehicle "side surface," a vehicle "front/rear surface," and "irrelevant" surfaces, respectively. These function data can be designed freely by designers.

Figure 11A:
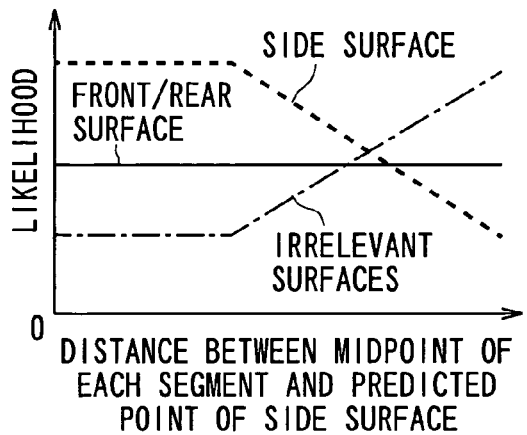

To be specific, in FIG. 11A, a distance between a midpoint coordinate of each segment and a predictive position on a vehicle side surface (detailed later) is used as an input. And in the case of FIG. 11A, a likelihood that the segment corresponding to an inputted distance approximates the vehicle front/rear surface, a likelihood that the segment corresponding to an inputted distance approximates a vehicle side surface, and a likelihood that the segment corresponding to an inputted distance falls into the irrelevant segments are outputted on the graphs. As shown in FIG. 11A, the function data are designed so that as the distance, i.e., segment, is made smaller, the likelihood that the segment approximates a vehicle side surface becomes larger.

Figure 11B:
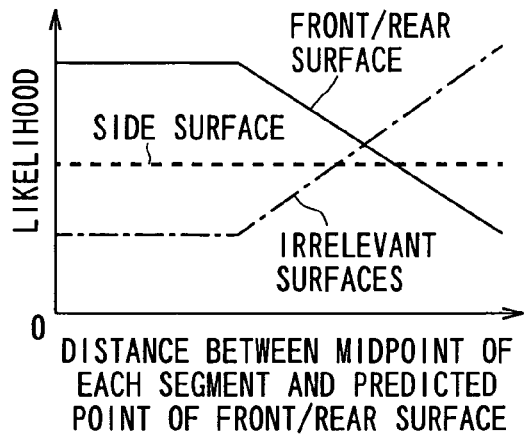

In the example in FIG. 11B, a distance between a midpoint coordinate of each segment and a predictive position on the vehicle front/rear surface is used as an input. A likelihood that the segment corresponding to an inputted distance approximates the vehicle front/rear surface, a likelihood that the segment corresponding to an inputted distance approximates a vehicle side surface, and a likelihood that the segment corresponding to an inputted distance falls into the irrelevant segments are outputted on the graphs. As shown, the function data are designed such that as the distance is made smaller, the likelihood that the segment approximates the vehicle front/rear surface becomes larger.

Figure 11C:
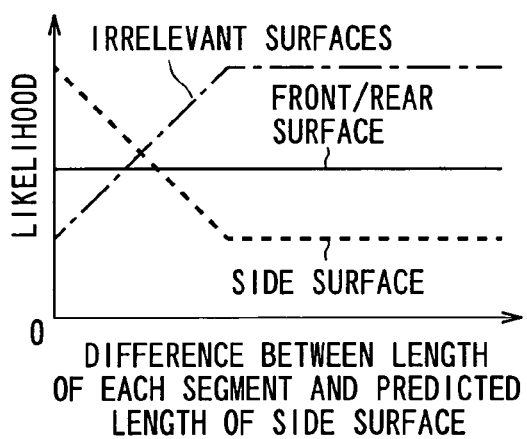

The example shown in FIG. 11C uses, as its input, a difference (absolute value) between a segment length and a predictive value of the vehicle side length (i.e., the whole length of a vehicle). A likelihood that the segment corresponding to an inputted difference approximates the vehicle front/rear surface, a likelihood that the segment corresponding to an inputted difference approximates a vehicle side surface, and a likelihood that the segment corresponding to an inputted difference falls into the irrelevant segments are outputted on the graphs. As shown, the function data are designed so that as the difference is made smaller, the likelihood that the segment approximates a vehicle side surface becomes larger.

Figure 11D:
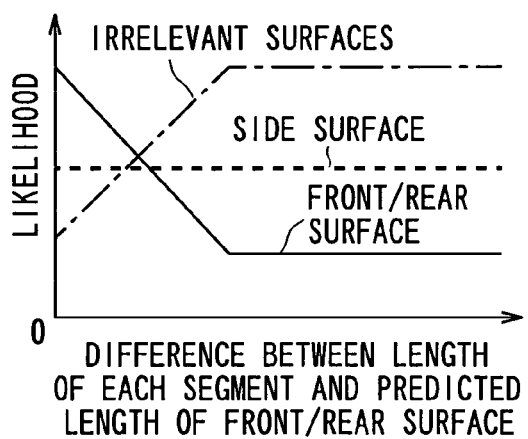

The example shown in FIG. 11D uses, as its input, a difference (absolute value) between a segment length and a predictive value of the vehicle front/rear surface length (i.e., the whole width of a vehicle). In this case, a likelihood that the segment corresponding to an inputted difference approximates the vehicle front/rear surface, a likelihood that the segment corresponding to an inputted difference approximates a vehicle side surface, and a likelihood that the segment corresponding to an inputted difference falls into the irrelevant segments are outputted on the graphs. Design is made such that the smaller the difference, the larger the likelihood that the segment approximates the vehicle front/rear surface.

Figure 11E:
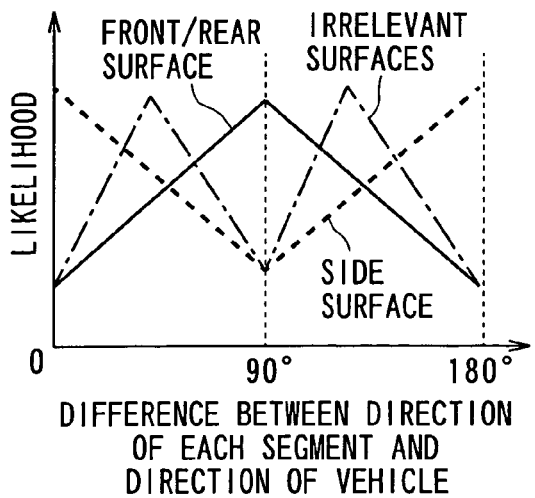

Further, the example shown in FIG. 11E uses, as its input, a difference between a segment direction and a predicative value for a vehicle direction. In this case, a likelihood that the segment corresponding to an inputted difference approximates the vehicle front/rear surface, a likelihood that the segment corresponding to an inputted difference approximates a vehicle side surface, and a likelihood that the segment corresponding to an inputted difference falls into the irrelevant segments are outputted on the graphs providing the function data. The function data are designed in such a manner that, as the difference approaches 90 degrees, the likelihood that the segment approximates the vehicle front/rear surface becomes larger, while the difference is closer to 0 degree or 180 degrees, the likelihood that the segment approximates a vehicle side surface becomes larger.

Figure 11F:
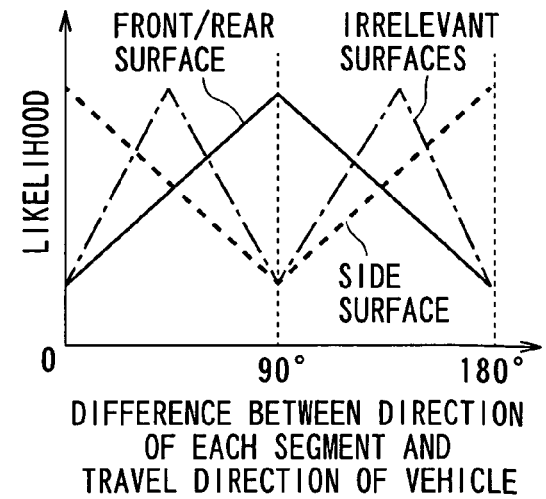

The example shown in FIG. 11F uses, as its input, a difference between a segment direction and a predicative value indicting a vehicle travel direction. In this case, a likelihood that the segment corresponding to an inputted, difference approximates the vehicle front/rear surface, a likelihood that the segment corresponding to an inputted difference approximates a vehicle side surface, and a likelihood that the segment corresponding to an inputted difference falls into the irrelevant segments are outputted on the graphs providing the function data. The function data are designed in such a manner that, as the difference approaches 90 degrees, the likelihood that the segment approximates the vehicle front/rear surface becomes larger, while the difference is closer to 0 degree or 180 degrees, the likelihood that the segment approximates a vehicle side surface becomes larger.

Referring to FIG. 10, the likelihood calculating process, which is executed by the CPU 25a at step S1500, will now be described. This process is repeated at given intervals.

At first, the CPU 25a reads in inputs of the sensors 30 to detect the motion state of the vehicle on which the present estimation apparatus 1 is mounted and, using the read-in data, calculates a displacement quantity (δx, δy, δθ) of the present vehicle, which is relative to the vehicle state calculated at the time when the vehicle-state estimating process was executed in the last execution cycle (step S1505). The values δx, δy and δθ show how much the origin of the coordinate system A is currently displaced from the position of the origin of the coordinate system A obtained when the last vehicle-state estimating process (i.e., step S1505) was executed. Of the values, δx denotes a displacement in the x-axis direction of the coordinate system A existing when the last vehicle-state estimating process was executed. Similarly, δy denotes a displacement in the y-axis direction of the coordinate system A existing when the last vehicle-state estimating process was executed. The value δθ denotes a rotated displacement of the y-axis of the coordinate system A which is present when the last vehicle-state estimating process was executed.

The CPU 25a then designates the segment L1 as the objective segment (step S1510), and designates a "side" as the objective surface area (step S1515). Further, the CPU 25a calculates a likelihood L(3000) showing the probability that the objective segment is a segment approximating the objective surface area, using an individual likelihood calculating process shown in FIG. 12 (step S3000). This individual likelihood calculating process will be detailed later.

This individual likelihood calculating process is followed by a step at step S1530, where it is determined by the CPU 25a whether or not the likelihood L(3000) has already been calculated for the "front/rear surface" which should be designated as the objective segment. If this determination becomes negative (NO at step S1530), the objective surface area is set to the "front/rear surface" (step S1535), before the processing is shifted to step S3000. Hence the individual likelihood calculating process is performed for this objective surface area, that is, the "front/rear surface."

When it is determined that the likelihood L(3000) for the "front/rear surface" designated as the objective surface area has already been calculated (YES at step S1530), it is further determined whether or not the likelihood L(3000) has already been calculated for the "irrelevant surfaces" which should also be designated as the objective surface area (step S1540).

If the determination at this step S1540 is negative (NO), the objective surface area to be processed is changed to the "irrelevant surfaces" (step S1545), and the processing is returned to step S3000. As a result, the individual likelihood calculating process is executed as to this "irrelevant surfaces," so that the likelihood L(3000) that the objective segment falls into the irrelevant segments is calculated.

In contrast, if the determination at step S1540 is positive (YES), that is, the likelihood L(3000) for the "irrelevant surfaces" has already been calculated, the CPU 25a determines whether or not the likelihood L(3000) for the second segment L2 has been calculated (step S1555). If the determination NO comes out at this step S1555, that is, no likelihood L(3000) for the segment L2 is calculated yet, this segment L2 is then designated as the objective segment to be processed (step S1560), before being returned to step S1515.

Meanwhile when it is determined at step S1555 that the likelihood L(3000) has already been calculated (YES), it is further determined whether or not the segment L22 has already been subjected to the calculation of the likelihood L(3000) (step S1565). If the calculation has not been performed yet (NO at step S1565), the objective segment is thus set to the segment L22 (step S1570), before being retuned to step S1515. However, the likelihood L(3000) for the segment L22 has already been calculated (YES at step S1565), this likelihood calculating process is ended.

In the following, the likelihoods L(3000) that the segment L1 approximates a vehicle side surface, the vehicle front/rear surface, and the irrelevant surfaces are denoted as likelihoods L(1 side), L(1 front/rear), and L(1 irrelevant); respectively.

This notation is true of the segments L21 and L22. In other words, the likelihoods L(3000) that the segment L21 approximates a vehicle side surface, the vehicle front/rear surface, and the irrelevant surfaces are denoted as likelihoods L(21 side), L(21 front/rear), and L(21 irrelevant), respectively. The likelihoods L(3000) that the segment L22 approximates a vehicle side surface, the vehicle front/rear surface, and the irrelevant surfaces are denoted as likelihoods L(22 side), L(22 front/rear), and L(22 irrelevant), respectively.

Referring to FIG. 12, the individual likelihood calculating process, which is executed by the CPU 25a at step S3000 in FIG. 10, will now be described.

In this individual likelihood calculating process, the CPU 25a acquires a prediction value showing the state of the vehicle, which is calculated at step S1800 in the last execution cycle (or control cycle, i.e., in the last vehicle-state estimating process) and stored in the RAM 25c at step S190 (step S3010). Though the process at step S1800 will be detailed later, it can be summarized such that an unscented Kalman filter is used to predict a positional coordinate (x1, y1) of a midpoint of a vehicle side surface, the positional coordinate (x2, y2) of a midpoint of the vehicle front/rear surface, the length N1 of the vehicle side surface, the length N2 of the vehicle front/rear face, the direction (angle) Θ1 of the vehicle, and the travel direction (angle) Θ1 of the vehicle, all of which are used in the next execution cycle. At step S190, these predicted values, which are obtained in the current coordinate system A, are stored in the RAM 25c.

Thus, at step S3010, pieces of information indicating those predicted values (x1, y1), (x2, y2), N1, N2, Θ1 and Θ2 for the vehicle state are read out from the RAM 25c for acquisition.

The CPU 25a then uses the displacement quantity (δx, δy, δθ) previously obtained at step S1505 to project the predicted values for the vehicle state expressed by the coordinate system A in the last vehicle-state estimating process to those expressed by the current coordinate system A, so that the predicted values are coordinate-transformed (step S3015).

The CPU 25a then moves to step S3020, where the CPU 25a calculates a distance between the predicted positional coordinate (x1, y1) at the midpoint of the vehicle side surface (in the last vehicle-state estimating process) and that of the midpoint of the objective segment currently calculated at step S120 or S1300. In addition, at step S3020, the CPU 25a applies the calculated distance as an input to the function data shown in FIG. 11A to calculate a likelihood L(3020) that the objective segment is a segment which approximates the objective surface area.

The CPU 25a then shifts its processing to step S3030, where a distance between the positional coordinate (x2, y2) of the midpoint of the vehicle front/rear surface, which is predicted in the last execution cycle, and that of the midpoint of the objective segment currently calculated at step S120 and S1300 is calculated. And, this calculated distance is inputted as an input to the function data shown in FIG. 11B, so that a likelihood L(3030) that the objective segment is a segment which approximates the objective surface area is calculated.

Further, the CPU 25a shifts its processing to step S3040, where the absolute value of a distance between the length N1 of the vehicle side surface, which is predicted in the last execution cycle (the last control cycle), and the length of the objective segment. And, the calculated difference (absolute value) is applied as an input to the function data shown in FIG. 11C so as to calculate a likelihood L(3040) that the objective segment is a segment which approximates the objective surface area.

Further, in the same manner as the above, at step S3050, the absolute value of a distance between the length N2 of the vehicle front/rear surface, which is predicted in the last execution cycle, and the length of the objective segment. And, the calculated difference (absolute value) is applied as an input to the function data shown in FIG. 11D so as to calculate a likelihood L(3050) that the objective segment is a segment which approximates the objective surface area.

Further, at step S3060, a difference (i.e., angle) between the vehicle direction Θ1 predicted in the last execution cycle and the direction of the objective segment is calculated, and the calculated difference is applied as an input to the function data shown in FIG. 11E. Hence, a likelihood L(3060) that the objective segment approximates the objective surface area is calculated. At step S3070, a difference (i.e., angle) between the vehicle travel direction Θ2 predicted in the last execution cycle and the direction of the objective segment is calculated, and the calculated difference is applied as an input to the function data shown in FIG. 11F. Hence, a likelihood L(3070) that the objective segment approximates the objective surface area is calculated.

After the foregoing preparatory processes, the likelihoods calculated at steps S3020 to S3070 are used to calculate a final likelihood L(3000) on a formula of $$L(3000)=$$

$$L(3020) \times L(3030) \times L(3040) \times L(3050) \times L(3060) \times L(3070),$$

before the individual likelihood calculating process is ended.

The above individual likelihood calculating process is followed by a posterior probability calculating process carried out by the CPU 25a at step S1600.

In the embodiment, in the posterior probability calculating process, the prior probability obtained at step S1400 and the likelihood obtained at step S1500 are applied to a Bayesian estimation technique. This application makes it possible that, for each of the segments L1, L21 and L22, a probability (posterior probability) that each segment approximates the vehicle side surface, a probability (posterior probability) that each segment approximates the vehicle front/rear surface, and a probability (posterior probability) that each segment belongs to the irrelevant surfaces are calculated.

With reference to FIG. 13, this posterior probability calculating process will now be detailed.

First, the CPU 25a designates the segment L1 as the objective segment (step S1605), and designates a "vehicle side surface" as the objective surface area (step S1610).

The prior probability P(1425) that the objective segment approximates the objective surface area and the likelihood L(3000) that the objective segment approximates the objective surface area are then applied to a Bayesian estimation formula, thus obtaining the posterior probability P(1615) that the objective segment approximates the objective surface area (step S1615).

At step S1615, in cases where the objective segment is the segment L1 and the objective surface area is the vehicle side surface, the posterior probability P(1615) is calculated on the following formula. In this formula, the posterior probability P(1615), which shows a probability the segment L1 approximates the vehicle side surface in this example, is denoted as $P_0$(1 side).

$P_0$(1 side)={L(1 side)·P(1 side)}/

{L(1 side)·P(1 side)+L(1 front/rear)·P(1 front/rear)

+L(1 irrelevant)·P(1 Irrelevant)}

As to the objective segment currently designated, it is then determined whether or not a posterior probability P(1615) that the objective segment approximates the vehicle front/rear surface has already been calculated. If the posterior probably P(1615) has not been calculated (NO at step S1630), the objected surface area is changed to the vehicle front/rear surface (step S1635), before returning to step S1615, where the posterior probability P(1615) for the vehicle front/rear surface designated as the objective segment is calculated.

As for the objective segment designated as the segment L1 and the objective surface area designated as the vehicle front/rear surface, the posterior probability P(1615) can be calculated on the following formula, where the posterior probability P(1615) as to the segment L1 and vehicle front/rear surface is denoted as $P_0$(1 front/rear).

$P_o$(1 front/rear)={L(1 front/rear)·P(1 front/rear)}/

{L(1 side)·P(1 side)+L(1 front/rear)·P(1 front/rear)

+L(1 irrelevant)·P(1 irrelevant)}

Furthermore, when, as for the currently designated objective segment, the posterior probability P(1615) that the objective segment approximates the vehicle front/rear surface has already been calculated (YES at step S1630), the CPU 25a further proceeds to another determination. That is, it is determined whether or not a posterior probability P(1615) that the currently designated objective segment belongs to the irrelevant segments has already been calculated (step S1640). If the determination at step S1640 is NO, that is, such a probability has not been calculated yet, the objective surface area is changed to the irrelevant surfaces (step S1645), and then the processing is returned to step S1615, where the posterior probability P(1615) that the objective segment belongs to the irrelevant segments is calculated.

As for the segment L1 designated as the objective surface area and the irrelevant surfaces designated as the objective surface area, the posterior probability P(1615) can be calculated on the following formula, where the posterior probability P(1615) that the segment L1 belongs to the irrelevant segments is denoted as $P_0$(1 irrelevant).

$P_0$(1 irrelevant)={L(1 irrelevant)·P(1 irrelevant)}/

{L(1 side)·P(1 side)+L(1 front/rear)·P(1 front/rear)

+L(1 irrelevant)·P(1 irrelevant)}

When the posterior probability P(1615) for the irrelevant segments has already been calculated (YES at step S1640), the CPU 25a determines whether or not the posterior probability P(1615) has already been calculated as to the segment L21 designated as the objective segment (step S1655). In this determination, if the negative answer comes out (NO at step S1655), the currently processed objective segment is changed to the segment L21 (step S1660), before returning to step S1610.

Thus, the foregoing steps including step S1615 are repeated, so that calculated are a posterior probability P(1615)=$P_0$(21 side) that the segment approximates a vehicle side surface, a posterior probability P(1615)=$P_0$(21 front/rear) that the segment approximates the vehicle front/rear surface, and a posterior probability P(1615)=$P_0$(21 irrelevant) that the segment falls into the irrelevant segments.

$P_o$(21 side)={L(21 side)·P(21 side)}/

{L(21 side)·P(21 side)+L(21 front/rear)·P(21 front/rear)

+L(21 irrelevant)·P(21 irrelevant)}

$P_o$(21 front/rear)={L(21 front/rear)·P(21 front/rear)}/

{L(21 side)·P(21 side)+L(21 front/rear)·P(21 front/rear)

+L(21 irrelevant)·P(21 irrelevant)}

$P_0$(21 irrelevant)={L(21 irrelevant)·P(21 irrelevant)}/

{L(21 side)·P(21 side)+L(21 front/rear)·P(21 front/rear)

+L(21 irrelevant)·P(21 irrelevant)}

When it is determined that the posterior probabilities P(1615) have been calculated for the segment L21 designated as the objective segment (YES at step S1655), a further determination whether or not posterior probabilities P(1615) for the segment L22 serving as the objective segment is made (step S1665). If this determination shows that the posterior probabilities P(1615) for the segment L22 are not calculated yet (NO at step S1655), the objective segment which should be processed currently is changed to the segment L22 (step S1670), before returning to step S1610.

In the same way as described already, the foregoing steps are repeated for the segment L22. Thus, calculated are a posterior probability P(1615)=$P_0$(22 side) that the segment approximates a vehicle side surface, a posterior probability P(1615)=$P_0$(22 front/rear) that the segment approximates the vehicle front/rear surface, and a posterior probability P(1615)=$P_0$(22 irrelevant) that the segment falls into the irrelevant segments.

$P_0$(22 side)={L(22 side)·P(22 side)}/

{L(22 side)·P(22 side)+L(22 front/rear)·P(22 front/rear)

+L(22 irrelevant)·P(22 irrelevant)}

$P_0$(22 front/rear)={L(22 front/rear)·P(22 front/rear)}/

{L(22 side)·P(22 side)+L(22 front/rear)·P(22 front/rear)

+L(22 irrelevant)·P(22 irrelevant)}

$P_0$(22 irrelevant)={L(22 irrelevant)·P(22 irrelevant)}/

{L(22 side)·P(22 side)+L(22 front/rear)·P(22 front/rear)

+L(22 irrelevant)·P(22 irrelevant)}

When it is determined that the posterior probabilities P(1615) have been calculated under the segment L22 (YES at step S1665), the posterior probability calculating process is ended.

On completion of this posterior probability calculating process at step S1600 in FIG. 2, the CPU 25*a* proceeds to a selection process (step S1700 in FIG. 2), which is detailed in FIG. 14. This selection process is executed repeatedly by the CPU 25*a* at given execution intervals given to the vehicle-state estimating process.

In the selection procession, the CPU 25*a* first makes a determination, where it is determined whether or not the posterior probability $P_0$(1 side); or the posterior probability $P_0$(1 front/rear); or both the posterior probability $P_0$(21 side) and the posterior probability $P_0$(22 front/rear); or both the posterior probability $P_0$(21 front/rear) and the posterior probability $P_0$(22 side) is (are) equal or over a predetermined threshold Th (step S1710). To be specific, it is determined at this step whether or not at least one among the four condition expressions of "$P_0$(1 side)$\geq$Th", $P_0$(1 front/rear)$\geq$Th", "$P_0$(21 side) and $P_0$(22 front/rear)$\geq$Th", and "$P_0$(21 front/rear) and $P_0$(22 side)$\geq$Th" is met. The threshold Th should be 0<Th<1 and may be chosen freely by designers.

When it is determined that none of the four conditions is met (NO at step S1710), the selection process is forced to end without executing steps S1720 to S1780.

In contrast, when it is determined at least one of the four conditions is met (YES at step S1710), the CPU 25*a* executes a determination where it is determined whether or not the posterior probability $P_0$(1 side) is a maximum among the group of posterior probabilities $P_0$(1 side), $P_0$(1 front/rear), $P_0$(22 front/rear), $P_0$(21 front/rear), and $P_0$(22 side) (step S1720).

If it is determined that the posterior probability $P_0$(1 side) is the maximum (YES at step S1720), it is recognized that the segment L1 approximates the vehicle side. In this case, an approximate graphic pattern consisting of the single segment is selected as a most-probable graphic pattern which typically represents the contour of the vehicle located ahead (step S1730). The selection process is then ended.

Meanwhile when the posterior probability $P_0$(1 side) is not the maximum (NO at step S1720), the CPU 25*a* further determines whether or not the posterior probability $P_0$(1 front/rear) is a maximum among the group (step S1740). If the determination is YES at step S1740, it is recognized that the segment L1 approximates the vehicle front/rear surface. In this case, an approximate graphic pattern consisting of the single segment is selected as a most-probable graphic pattern which typically represents the contour of the vehicle located ahead (step S1750). The selection process is then ended.

When it is determined that the posterior probability $P_0$(1 front/rear) is not the maximum (NO at step S7140), the determination whether or not either one of the posterior probability $P_0$(21 side) and the posterior probability $P_0$(22 front/rear) is a maximum among the group.

When any one of the posterior probability $P_0$(21 side) and the posterior probability $P_0$(22 front/rear) is a maximum (YES at step S1760), it is considered that the segment L21 is a segment approximating the vehicle side surface and the segment L22 is a segment approximating the vehicle front/rear surface. Hence an L-shaped approximate graphic pattern is selected as a most-probable graphic pattern for the contour of the vehicle located ahead now (step S1770). The selection process is then ended.

Meanwhile it is determined that any of the posterior probability $P_0$(21 side) and the posterior probability $P_0$(22 front/rear) is not the maximum among the group of probabilities (NO at step S1760), the CPU 25*a* judges that the segment L21 approximates the vehicle front/rear surface and the segment L22 approximates the vehicle side surface. Accordingly, an L-shaped approximate graphic pattern is selected as a most-probable graphic pattern as the contour of the vehicle (step S1780), before ending the selection process.

On completion of the selection at step S1700, the CPU 25a shifts to step S1800 in FIG. 2, where a state estimating process shown in FIG. 17 is executed.

In the present embodiment, the present/past state estimating process is executed based on the results measured at step S110, with the result that a present vehicle state and a vehicle state in executing the next vehicle-state estimating process (i.e., in the next execution cycle). This present/past state estimating process will now be outlined, prior to detailed descriptions shown in FIG. 17.

In the present/past state estimating process, the results of the selection at step S1700, the positional coordinates, directions and lengths of the mid points of the respective segments L1, L21 and L22 calculated at steps S120 and S1300 are used. According to these pieces of information, the object located ahead is regarded as a vehicle. And in the current coordinate system A, the positional coordinate $(x0_m, y0_m)$ of the central point of the ahead-located vehicle, the direction $\theta_m$ (an angle made from the x-axis of the vehicular front/rear direction axial line in the coordinate system A) of the vehicle, and the whole length Lm and whole width Wm of the vehicle are obtained (refer to FIG. 16).

These observations (observed values) z, which are expressed by $$z = [x0_m y0_m \theta_m W_m L_m]^T,$$

which are then replaced by observations expressed in a later-described coordinate system B. The coordinate-converted observations z are inputted to a Kalman filter, so that state quantities $x_s$ expressing the ahead-located vehicle in the coordinate system B can be obtained by a formula of $$x_s = [x0 v_x y0 v_y \theta \omega W L]^T,$$

which are outputs of the Kaman filter. In this formula, $x_0$ denotes a coordinate of the ahead-located vehicle center point on the x-axis in the coordinate system B, $V_x$ denotes an x-axis component of the speed of the vehicle, $y_0$ denotes a coordinate of the vehicle center point on the y-axis in the coordinate system B, $V_y$ denotes a y-axis component of the speed of the vehicle, $\theta$ denotes an angle made between the x-axis and the vehicle side surface (or the vehicle front/rear directional axis) (this angle $\theta$ is normalized as being $0 \leq \theta < \pi$), $\omega$ denotes the temporal differentiation of the angle $\theta$ (i.e., angular velocity), W denotes the whole width of the vehicle, and L denotes the whole length of the vehicle.

Specifically, the present embodiment adopts, as the Kalman filter, the unscented Kalman filter (UKF) applicable to a non-linear motion mode so that the state quantities $x_s$ of the vehicle located ahead can be obtained. FIG. 15 explains how to estimate the state quantities $x_s$ from the observations z.

The ROM 25b of the estimation apparatus 1 according to the present embodiment stores therein a program for allowing the CPU 25a to function as the unscented Kalman filter. At step S1800 in FIG. 2, the CPU 25a reads in this program from the ROM 25b for execution, whereby the state quantities $x_s$ can be calculated.

The unscented Kalman filter is configured based on a known algorithm, in which a proper transfer function, which is defined on a motion model and an observation model is given from designers, provides outputs in response to inputs thereto.

In the following, the unscented Kalman filter will now be described concerning a motion model, an observation model and input/output parameters to and from the unscented Kalman filter, which are necessary to design the unscented Kalman filter used by the estimation apparatus 1 according to the present embodiment.

As shown In FIG. 15, inputted to the unscented Kalman filter are the foregoing observations (observed values) z(t) calculated based on the measured results in the newest execution cycle and the state quantities $x_s(t, t-1)$ calculated and outputted by the unscented Kalman filter based on the observations z(t-1) in the previous execution cycle t-1. Calculation of the unscented Kalman filter on these inputted quantities provides, as outputs, state quantities $x_s(t, t)$ indicative of the current vehicle states and state quantities $x_s(t+1, t)$ indicative of the vehicle states in the next execution cycle. In the present embodiment, the vehicle state quantities $x_s$ in the time (cycle) $t_1$, which are calculated on the observations $z(t_2)$, that is, inputs in the time (cycle) $t_2$, are represented as $x_s(t_1, t_2)$.

The state quantities $x_s(t, t)$ outputted from the unscented Kalman filter, which indicate the current vehicle state, are sent to an in-vehicle network communicably connected to the controller 25 of the estimating apparatus 1. This sending operation is under the control of the PCU 25a. The state quantities $x_s(t, t)$ indicating the current vehicle state and the state quantities $x_s(t+1, t)$ indicating the vehicle state in the next execution cycle are stored into the RAM 25c. Of these, the state quantities $x_s(t+1, t)$ are used in performing the next-cycle state estimating process, as described. The state quantities $x_s(t, t)$ stored in the RAM 25c are used in replacing the observations z(t) into values in the coordinate system B when the state next-cycle estimating process is executed.

The coordinate system B used by the unscented Kalman filter is an x-y coordinate system which is set based on the position and direction of the ahead-located vehicle, which were obtained in the last execution cycle. Concretely, in this coordinate system B, the origin is shifted to the positional coordinate (x0, y0) of the central point of the vehicle shown by the state quantities $x_s(t-1, t-1)$ estimated in the last execution cycle t-1. Moreover, the y-axis is shifted to the direction (the front/rear (longitudinal) directional axis) of the vehicle shown by the state quantities $x_s(t-1, t-1)$, while the x-axis is set to be perpendicular to the shifted y-axis. The transformation from the coordinate system A to the coordinate system B needs parameters showing displacement quantities of the apparatus-mounted vehicle from the cycles t−1 to t. The parameters $(\delta x, \delta y, \delta \theta)$ obtained at step S1505 are used as such parameters. This coordinate transformation is carried out on the Helmart conversion. In the present embodiment, the vehicle 50 located ahead is taken as a reference point to set the coordinate system, but this is just an example. Any point can be adopted as a reference for setting the coordinate system.

Next, the motion model of the unscented Kalman filter will now be described.

The estimation apparatus 1 according to the present embodiment is provided with an unscented Kalman filer (hereinafter abbreviated as "UKF 1"), which is designed on a later-described non-linear motion model and an unscented Kalman filter (hereinafter abbreviated as "UKF 2"), which is designed on a later-described linear motion model. Both UKF1 and UKF2 are switched over therebetween for estimating the vehicle state.

The UKF 1 is designed on a uniform circular motion model employed as the non-liner motion model, and used when it is estimated that the ahead-located vehicle is in a circular motion. Practically, the UKF 1 is designed on the following motion model.

$$x^* = -\frac{\sqrt{v_x^2 + v_y^2}}{\omega \cdot (1 - \cos \omega T_s)}$$

$$y^* = \frac{\sqrt{v_x^2 + v_y^2}}{\omega \cdot \sin \omega T_s}$$

$v^*_x = v_x \cos \omega T_s - v_y \sin \omega T_s$ $v^*_y = v_x \sin \omega T_s + v_y \cos \omega T_s$ $\theta^* = \theta + \omega T_s$ $\omega^* = \omega$ $W^* = W$ $L^* = L$ The reason the uniform circular motion model is used that it is easier to estimate circular motions.

The symbol "*" appearing in the formulae means to show each value obtained after one execution cycle of the vehicle-state estimating process repeatedly executed and $T_s$ denotes a repetition cycle (time). The parameters x and y means the central position of the vehicle located ahead and correspond to the input $x0_m$ and $y0_m$ to the unscented Kalman filter.

The relationship between "$x^*, y^*, v_x^*, v_y^*, \theta^*$ and $\omega^*$" and "$x, y, v_x, v_y, \theta$ and $\omega$" can be obtained using conditions regulating a uniform circular motion. The whole width W and whole length L of the vehicle are regarded as being independent of time, thus being constant over time.

This motion model has $\omega$ in its denominator, so that it is impossible to calculate the motion model provided that $\omega$ is zero. Hence when $\omega$ is zero, the UKF 2 is used in estimating the state quantities $x_s$, which allows the motion model to transform from a uniform circular motion model to a uniform linear motion model. Using this transformed motion model, the state quantities $x_s$ is estimated.

That is, the UKF 2 according to the present embodiment is designed on the unique linear motion model, which falls into the linear motion model, is used when it is estimated that the vehicle located ahead is in a linear motion. Meanwhile, the UKF 1 is designed on the following motion model and mounted in the estimation apparatus.

$x^* = x + v_x T_s$ $y^* = y + v_y T_s$ $v^*_x = v_x$ $\theta^* = \theta$ $\omega^* = 0$ $W^* = W$ $L^* = L$ The observation models in the UKFs 1 and 2 are normalized so that, with regard to z(t), $\theta_m$ is $0° \leq \theta_m < 180°$. Incidentally, the observation models can be designed freely by designers.

In the present embodiment, the thus-configured UKFs 1 and 2 are used to estimate the state quantities $x_s$ of the vehicle located ahead.

Next, with reference to FIG. 17, how to set the observed values z(t) for the unscented Kalman filter will now be simply explained. This setting process is provided by steps S1805 to S1842 in the state estimating process in FIG. 17.

As already stated, in the state estimating process, to set the observed values z(t), the positional coordinate ($x0_m$, $y0_m$) of the center of a vehicle located ahead, the direction $\theta m$ of the vehicle, and the whole length Lm and whole width Wm of the vehicle are obtained. As a matter of course, a surfaced portion to be measured depends on how the vehicle is located, for example, located as shown in FIG. 4A or FIG. 4B. Hence, the procedures for obtaining the central positional coordinate (x0m, y0m) of the vehicle are changed. How to set the observed values z(t) will now be exemplified as follows.

FIG. 16 shows how to calculate the observed values z(t) in cases where it is determined in the selection process that the segment L21 approximates the vehicle side surface and the segment L22 approximates the vehicle front/rear surface.

As shown in FIG. 16, in this case, the segments L21 and L22 are set to the whole length $L_m$ and whole width $W_m$ of the vehicle. Further, the angle made between the x-axis and the segment L21 is set to the direction $\theta_m$ of the vehicle. A segment L3 is formed to connect an end of the segment L21, which is not connected to the segment L22, and an end of the segment L22, which is not connected to the segment L21. This segment L3 has a midpoint, which is set to the central point of the vehicle. The x-axial and y-axial coordinates of this central point are designated as $x_m$ and $y_m$. In this way, the observed values z(t) is set.

When it is determined in the selection process that the segment L22 approximates the vehicle side surface and the segment L21 approximates the vehicle front/rear surface, $x_m$, $y_m$, $\theta_m$, $W_m$, and $L_m$ are also set by reading the segments L21 and L22 as L22 and L21, respectively, in the above description for the calculation of the observed values z(t).

Meanwhile, when it is determined in the selection process that the segment L1 approximates the vehicle side surface or the vehicle front/rear surface, the determination at step S1805 becomes affirmative and $x_m$, $y_m$, $\theta_m$, $W_m$, and $L_m$ are set as follows. In connection with FIG. 17, the state estimating process executed by the CPU 25a at step S1800 will now be detailed.

In this state estimating process, the CPU 25a first determines whether or not, at step S1700, the approximate graphic pattern consisting of a single graphic pattern has been selected as the most probable graphic pattern for the profile of the vehicle located ahead (step S1805). If this determination reveals the selection of such approximate graphic pattern (YES at step S1805), the processing is shifted to step S1810. In contrast, when the L-shaped approximate graphic pattern has been selected as the most probable pattern at step S1700 (NO at step S1805), the processing is shifted to step S1842, skipping steps S1810 to S1840.

At step S1810, the CPU 25a determines whether or not, as for the currently targeted vehicle 50 located ahead, the L-shaped approximate graphic pattern had been selected as the most probable graphic pattern in the past execution cycles.

If the determination at this step S1810 reveals the selection of the L-shaped approximate graphic pattern in the past execution cycles (YES at step S1810), it is further determined whether or not the segment L1 has been determined as a segment approximating the vehicle front/rear surface in the current selection process (step S1815). When it has been determined that the segment L1 approximates the front/rear surface (YES at step S1815), the length of the vehicle side surface and the length of the segment L1, which were estimated in the past, are set to $L_m$ and $W_m$, respectively. And these values $L_m$ and $W_m$ are given to z(t) (step S1820). The processing is then shifted to step S1842.

In contrast, when it is determined that the segment L1 approximates the vehicle side surface (NO at step S1815), the length of the vehicle front/rear surface and the length of the segment L1, which were estimated in the past, are set to $W_m$ and $L_m$, respectively (step S1825). The processing is then shifted to step S1842.

By the way, if the determination NO comes at step S1810, that is, the L-shaped approximate graphic pattern had been selected in the past selection cycles, the processing is moved to step S1830. At this step, it is determined as to whether or not the segment L1 has been determined as a segment approximating the vehicle front/rear surface in the current selection process.

When the determination at step S1830 is YES, that is, the segment L1 approximates the front/rear; surface, the length of this segment L1 is given to $W_m$ and a predetermined length is given to the length $L_m$ of the vehicle side surface (step S1835). The predetermined length is, for example, chosen as a length which provides a peak in the probability of the side surface shown in FIG. 9A. The processing then proceeds to step S1842.

Meanwhile, if the determination at step S1830 is NO, that is, the segment L1 approximates the vehicle side surface, the length of this segment L1 is given to $L_m$ and a predetermined length is given to the length $W_m$ of the vehicle front/rear surface (step S1840). The predetermined length is, for example, chosen as a length which provides a peak in the probability of the front/side surface shown in FIG. 9A. After this, the processing proceeds to step S1842.

At step S1842, the CPU 25a sets the observed values z(t) to be inputted to the unscented Kalman filter.

To be specific, the filter is used to set the observed values z(t) when the L-shaped approximate graphic pattern is selected as the most probable graphic pattern for the profile of the targeted vehicle at step S1700, that is, when the selection process selects either a case where the segment L21 is determined as the segment approximating the vehicle side surface and the segment L22 is determined as the segment approximating the vehicle front/rear surface, or, a case where the segment L21 is determined as the segment approximating the vehicle front/rear surface and the segment L22 is determined as the segment approximating the vehicle side surface.

Meanwhile, the selection process at step S1700 is made such that the approximate graphic pattern consisting of a single segment is selected as the most probable graphic matter, that is, it is determined that the segment L1 approximates the vehicle side or rear/front surface, the values $W_m$ and $L_m$ and information of the segment L1 are used to calculate the values z(t) including the positional coordinate $(x0_m, y0_m)$ of the central point of the vehicle, so that the observed values z(t) are set (step 1842). The values $W_m$ and $L_m$ are set at any one of steps S1820, S1825, S1835 and S1840. Practically, the middle point of the segment L1 is used as the basic point, and the half length of the vehicle whole width $W_m$ or whole length $L_m$ is moved from the basic point along a perpendicular direction to the segment L1, along the direction the y value in the coordinate system A (the xy coordinate) becomes larger. Each moved point is regarded as the central point of the vehicle located head, and the positional coordinate $(x0_m, y0_m)$ of the central point of the vehicle is calculated. In addition, the direction $\theta_m$ is calculated, so that the observed values z(t) are set.

The observed values z(t), which is set in the coordinate system A at step S1842, is converted to those in the coordinate system B (step S1845). In other words, the observed values z(t) in the coordinate system A are projected to those in the coordinate system B whose original point is the vehicle central point coordinate (x0, y0) pointed out by the state quantities $x_s(t-1, t-1)$ estimated by the vehicle-state estimating process performed in the last execution cycle.

Further, the state quantities $x_s(t, t-1)$, which are predicted values for the current vehicle state estimated by the vehicle-state estimating process performed in the last execution cycle, are converted from those in the coordinate system B in the last execution cycle to those in the coordinate system B in the current execution cycle (step S1847). The coordinate system B in the last execution cycle is defined as a coordinate system whose original point is the vehicle central point coordinate (x0, y0) pointed out by the state quantities $x_s(t-2, t-2)$. In addition, the coordinate system B in the current execution cycle is defined as a coordinate system whose original point is the vehicle central point coordinate (x0, y0) pointed out by the state quantities $x_s(t-1, t-1)$.

It is then determined whether or not the angular velocity $\omega$ given by the state quantities $x_s(t-1, t-1)$, which are estimated results of the last vehicle-state estimating process (step S1850). When the angular velocity $\omega$ is zero (YES at step S1850), the motion model used at step S1865 is changed to a uniform linear motion model (i.e., to the UKF 2) (step S1860). In contrast, when the angular velocity $\omega$ is not zero (NO at step S1850), the motion model used at step S1865 is set to a uniform circular motion model (i.e., to the UKF 1) (step S1855), before being shifted to step S1865.

At step S1865, to the unscented Kalman filter designed for the designated motion model, the observed values z(t) converted to the coordinate system B and the state quantities $x_s(t, t-1)$ are inputted. Hence, the unscented Kalman filter provides the state quantities $x_s(t, t)$ indicating the current vehicle state and the state quantities $x_s(t+1, t)$ indicating the vehicle state in the next execution cycle.

Namely, when it is determined that the angular velocity $\omega$ is zero (YES at step S1850), the UKF 2 is used to calculate the state quantities $x_s(t, t)$ and the state quantities $x_s(t+1, t)$. Meanwhile, when it is determined that the angular velocity co is not zero (NO at step S1850), the UKF 1 is used to calculate the state quantities $x_s(t, t)$ and the state quantities $x_s(t+1, t)$.

At step S1865, the data indicating the state quantities $x_s(t, t)$ and $x_s(t+1, t)$, which have been obtained in the converted coordinate system B, are stored in the RAM 25c. The state estimating processing is thus ended.

In FIG. 2, after step S1800, the processing is made to proceed to step S190, where the prediction values for the vehicle state used in the next likelihood calculating process are calculated based on the state quantities $x_s(t+1, t)$, and the calculated results are stored into the RAM 25c.

Precisely, the vehicle whole length L given by the state quantities $x_s(t+1, t)$ is set to a parameter N1 and the vehicle whole width W given by the state quantities $x_s(t+1, t)$ is set to a parameter N2. In addition, the vehicle direction $\theta$ given by the state quantities $x_s(t+1, t)$ is replaced by that in the current coordinate system A, and the vehicle direction $\theta$ expressed in the coordinate system A is set to a parameter $\Theta1$. The vehicle velocity vector $(v_x, v_y)$ given by the state quantities $x_s(t+1, t)$ is also replaced by that in the current coordinate system A, and an angle between the x-axis and the replaced velocity vector $(v_x, v_y)$ in the coordinate system A is set to a parameter $\Theta2$.

The positional coordinate (x0, y0) of the central point of the vehicle, which is shown by the state quantities $x_s(t+1, t)$, is replaced by that in the current coordinate system A, and the positional coordinates (x1, y1) and (x2, y2) of midpoints of the vehicle side surface and front/rear surface, respectively, are calculated as follows.

From the vehicle central point (x0, y0) in the coordinate system A serving as the basic point, move is made along the vehicle front-rear directional axis so as to reduce the y-axial value in the coordinate system A by half the vehicle whole length L, so that the moved point can be decided as the positional coordinate (x2, y2) of the midpoint of the vehicle front/rear surface. Similarly, from the vehicle central point (x0, y0) in the coordinate system A serving as the basic point, move is made along the axis perpendicular to the vehicle front-rear directional axis so as to reduce the y-axial value in the coordinate system A by half the vehicle whole width W, so that the moved point can be decided as the positional coordinate (x1, y1) of the midpoint of the vehicle side surface. When the y-axial value is not changed, the move may be made in either way along the axis.

These values (x1, y1), (x2, y2), N1, N2, Θ1 and Θ2 are stored in the RAM 25c as the predicted values for the vehicle state. xs(t, t) which is current information showing the vehicle 50, which is obtained at step S1800, is provided to the in-vehicle network (step S200), and the series of steps in FIG. 2 is completed.

As described, the vehicle-state estimating process in the present embodiment has the capability of processing vehicles turn motions, greatly widening the availability compared to the conventional. The information from this vehicle-state estimating process can be utilized for vehicle collision prevention when the estimation apparatus is mounted on each vehicle. Of course, the estimation apparatus according to the embodiment may be mounted along a curved road, differently from the conventional.

In the present estimation apparatus 1, not only the positional coordinates but also the graphic patterns are used for the estimation. That is, the fact that the profiles of general vehicles are similar to each other is considered in the estimation. The profiles of vehicles (four-wheel vehicles) are modeled and reference is made between the models and the measured positional results, which makes it possible to estimate the state of a vehicle which is present in the frontward field in a more accurate manner.

The present estimation apparatus 1 is also able to provide various other advantages.

In the embodiment, the profile of the vehicle 50 is regarded as being a rectangle, and the position, direction and size of the rectangle are obtained. However, reflection points acquired by the measurement provides no information as to what portions of the vehicle are measured. That is, it is difficult to distinguish the refection points on the front surface or rear surface (front/rear) of a vehicle, only a side surface of the vehicle, or on both the front/rear surface and a side surface of the vehicle from each other. To resolve this problem, the two graphic patterns consisting of a signal line segment and an L-shaped segment respectively are used for approximating the vehicle and obtaining the approximation error. This approximation error is taken into consideration in estimating the vehicle state. Hence, whichever the vehicle is directed at timing when the reflection points are measured, it is possible to accurately estimate the state of the vehicle located ahead.

Moreover, for each segment, its position, direction, length, and approximation error are calculated, thus approximating in detail the profile pattern of the vehicle. This leads to a more accurate estimation of the vehicle.

Further, for each segment approximated, the probability that each segment approximates the vehicle front/rear surface and the probability that each segment approximates the vehicle side surface are calculated and, based on these objective indexes, either the signal segment or the L-shaped segment is selected as either graphic pattern for the estimation, thus providing the vehicle state estimation with high accuracy.

In the present estimation apparatus 1, from another point of view, it can be summarized such that the observed values are used to predict the vehicle state in the next observation time (in the next execution cycle). And, in the next observation time, observed values are obtained, so that the observed values and the predicted vehicle state in the last observation time are used to estimate the vehicle state in the current observation time. In this way, not only the current instantaneous observed values but also the past observed values are taken into consideration in estimating the current vehicle state. Hence, in comparison with the case involving no observed values in the estimation, the estimation apparatus 1 according to the present embodiment is able to estimate the vehicle state more accurately.

Furthermore, in the present estimation apparatus, even if disturbance causes failure in detecting the reflection points of radar waves in the current execution cycle, it is still possible to estimate the vehicle state on the predicted results in the past execution cycle.

To use the Bayesian estimation, it is required to know a prior probability and a likelihood corresponding to the prior probability. In the present embodiment, the prior probability is calculated for each segment, as described. In addition, for each segment, the likelihood is calculated as described. This way leads to calculation of more reliable probabilities, resulting in a more reliable estimation of the state of a vehicle located ahead.

In addition, the prior probability for each segment can be calculated in consideration of the travel direction of a vehicle, which is predicted, as described in the foregoing embodiment. Considering the vehicle travel direction in this way provides a more reliable estimation of vehicle states.

As another aspect, the present invention provides an estimation apparatus for estimating a motion state of a vehicle located in a frontward field which is present in front of the estimation apparatus, comprising: measurement means for measuring positional coordinates of a plurality of positions on a surface of an object to be targeted, by radiating radar waves toward the frontward field and receiving reflected radar waves from an object located ahead in the frontward field; and estimation means for estimating the motion state of the vehicle based on the positional coordinates measured by the measurement means and a predetermined non-linear motion model for the vehicle.

As another aspect of the embodiment, the non-linear motion model is used, so that the vehicle state including the angular velocity of the vehicle can be estimated. Hence it is possible to estimate the turning motion of a vehicle. This estimation is useful for performing the vehicle control according to collision prevention between vehicles.

The factors estimated as the vehicle motion state are not limited to the vehicle angular velocity, but may include at leas one selected from a group consisting of the position, direction, speed, and travel direction of the vehicle. This allows the estimation apparatus to estimate vehicle turning motions more accurately, thus being useful for control of preventing inter-vehicle collisions.

In the embodiment, the Kalman filter is used for estimating the vehicle state. This suppresses influence of observation errors in the estimation, thus providing higher accuracy to the estimation.

Especially, the unscented Kalman filter has high performance in estimating non-linear motion states of objects, thus, in this regard, providing higher accuracy to the estimation as well.

In addition, as described, the uniform circular motion model is employed to design the Kalman filter and the designed Kalman filter is used for the estimation. Thus, the motion model can be simplified, while still estimating the vehicle turning motions in a reliable and accurate manner.

In the embodiment, as described, in response to an angular velocity of zero estimated in the last execution cycle, the motion model for estimating the vehicle state can be switched from the non-linear motion model to a preset linear motion model. It is therefore possible to estimate vehicle motion states in a wide range of motions including the linear motion and the turning motion.

Incidentally, the processing in the present embodiment is based on the condition where four or more reflection points should be measured. However, this is not a decisive condition. The number of measured reflection points may be two or three.

In the case of two reflection points, the CPU 25*a* calculates the length, direction, and midpoint of a segment connecting the two reflection points at step S120, instead of using the least square technique. Then, step S1300 for the two-segment calculating process is skipped, and in the processes from step S1400 to step S1700, the processes based on the results of the two-segment calculating process are also omitted. That is, only a process performed is that it is selectively determined that the segment obtained at step S120 approximates either the vehicle front/rear surface or the vehicle side surface. The other processes are the same as those in the described.

In the case of three reflection points, the CPU 25*a* executes the following processing, instead of the two-segment calculating process. There are three segments produced by connecting two points of all the three reflection points, so the three segments are designated. From the three segments, two segments are selected by for example specifying a combination of the two segments which makes an inferior angle which is the closest to 90 degrees. The processes at step S1400 and subsequent steps are the same as those explained.

Processes necessary when the determination is NO at step S1710 have not been explained in the foregoing embodiment. In this case, the vehicle-state estimating process may be interrupted, and when it is found that there is no object showing a vehicle in the frontward field, the measurement may be restarted, where the last state quantities $x_s(t, t-1)$ which were preserved in the last vehicle-state estimating process are outputted as the current state quantities $x_s(t, t)$.

In addition, the processes at steps S1845 and S1847 cannot be performed as long as the values of $x_s(t, t-1)$ are not stored in the RAM 25*c*. In this case, the processes thereafter may be omitted, while the observed values z(t) are stored in the RAM 25*c*, before ending the processes in the current execution cycle. As a result, in the next vehicle-state estimating process, the processes at steps S1845 and S1847 are executable. Incidentally, when the unscented Kalman filter performs its initial process, predetermined initial values are given to the velocities $v_x$, $y_x$ and angular velocity $\omega$ and necessary predicted values are replaced with observed values to obtain the state quantities $x_s$.

Further, in the likelihood calculating process, it is needed to have the predicted values for the vehicle state. When these predicted values have not been stored in the RAM 25*c* yet, the likelihood calculating process and posterior probability calculating process are skipped, so that, with the prior probability P set to the posterior probability $P_0$ without being changed, the processing proceeds to the selection process.

In the foregoing embodiment, steps S1400 to S1842 functionally compose estimation means according to one aspect of the invention. Steps S120 to S1865 functionally compose estimation means according to a second aspect of the invention. Step S110 functionally composes measurement means, steps S120 to S1300 functionally compose analysis means, steps S1400 to S1600 functionally compose probability calculating means, step S1700 functionally composes selection means, and steps S1845 to S1865 and S190 functionally compose prediction means.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An estimation apparatus for estimating a state of a vehicle located in a frontward field which is present ahead of the estimation apparatus, comprising:

means for measuring positional coordinates of a plurality of positions which are present on an object targeted in the frontward field, by radiating radar waves toward the frontward field and receiving reflected radar waves from the frontward field;

means for obtaining a position, a direction and a size of a graphic pattern by approximating the graphic pattern into a profile pattern of an object located in the frontward field, the graphic pattern being modeled as a profile of a vehicle and having an unknown direction and an unknown size, the profile pattern being expressed by the positional coordinates measured by the measuring means;

wherein the graphic pattern includes a first graphic pattern consisting of a single segment that models one surface of the vehicle and a second graphic pattern being L-shaped and consisting of a pair of mutually-orthogonal segments that models a front or rear surface of the vehicle and a side surface of the vehicle, the graphic pattern obtaining means includes i) means for approximating the profile pattern of the object into an approximated profile pattern by using each of the first and second graphic patterns, and ii) means for obtaining a position, a direction and a length of each of segments composing each of the first and second graphic patterns and an approximation error between each segment and the profile pattern as the position, direction and size of each of the first and second graphic patterns and the approximation error between each of the first and second graphic patterns and the approximated profile pattern; and means for estimating, as the state of the vehicle, a position of the vehicle, a direction of the vehicle, and one of a whole length and a whole width of the vehicle based on the position, the direction, and the size of the graphic pattern obtained by the obtaining means, wherein the estimating means comprises:

means for calculating, as for each of the three segments of the first and second graphic patterns, a probability that each segment is a segment that approximates the front or rear surface of the vehicle and a probability that each segment is a segment that approximates the side surface of the vehicle based on the position, direction and length of each segment and the approximation error between each segment and the profile pattern;

means for selecting a most probable graphic pattern directed to the profile of the vehicle from a set of the graphic patterns in response to calculated probabilities by the calculating means, under a condition where the object is regarded as the vehicle; and means for estimating, as to the selected graphic pattern, the position of the vehicle, the direction of the vehicle, and at least one of the whole length and the whole width of the vehicle based on the obtained position, direction, and length of each segment of each of the first and second graphic patterns and the approximation error between each segment composing each of the first and second graphic patterns and the profile pattern.

2. The estimation apparatus of claim 1, wherein the measuring means operates repeatedly at execution cycles and the graphic pattern obtaining means and the state of the vehicle estimating means are operable repeatedly together with the repetition of the measuring means, the apparatus comprises means for predicting, prior to estimating the state of the vehicle, the state of the vehicle in the next execution cycle of the estimating means by applying, to a predetermined motion model of the vehicle, the state of the vehicle estimated by the estimating means in the past cycle, and the probability calculating means is configured to calculate the probabilities based on the position, length, and direction of each segment and the approximation error between each segment and the profile pattern, which are obtained in the current execution cycle, and the state of the vehicle predicted by the prediction means.

3. The estimation apparatus of claim 2, wherein the probability calculating means comprises means for calculating, for each segment, the probabilities based on the length of each segment and the approximation error obtained by the analysis means, means for calculating, for each segment, a likelihood corresponding to each prior probability based on the position, direction and length of each segment obtained by the analysis means and the state of the vehicle predicted by the prediction means, means for calculating, for each segment, as the probabilities, a posterior probability that each segment approximates the front or rear surface of the vehicle and a posterior probability that each segment approximates the side surface of the vehicle by applying a Bayesian estimation technique to the calculated prior probabilities and the calculated likelihoods.

4. The estimation apparatus of claim 3, wherein the prediction means is configured to use the state of the vehicle estimated in the past by the estimation means to i) predict, according to the predetermined motion model, the state of the vehicle to be estimated by the estimating means in the next execution cycle and ii) predict, according to the predetermined motion model, a travel direction of the vehicle to be estimated by the estimation means in the next execution cycle, and the likelihood calculating means is configured to calculate, for each segment, the likelihoods based on i) the state of the vehicle and the travel direction of the vehicle both predicted by the prediction means and ii) the direction, position and length of each segment obtained by the analysis means in the current execution cycle.

* * * * *